(12) United States Patent
Iwao et al.

(10) Patent No.: US 6,533,663 B1
(45) Date of Patent: Mar. 18, 2003

(54) METHOD OF ASSISTING SELECTION OF ACTION AND PROGRAM PRODUCT AND GAME SYSTEM USING SAME

(75) Inventors: Kenichi Iwao, Tokyo (JP); Yukio Ando, Osaka (JP); Kenro Tsujimoto, Osaka (JP)

(73) Assignee: Square Co., Ltd., Tokyo (JP)

( * ) Notice: Subject to any disclaimer, the term of this patent is extended or adjusted under 35 U.S.C. 154(b) by 0 days.

(21) Appl. No.: 09/580,570

(22) Filed: May 30, 2000

(30) Foreign Application Priority Data

Jul. 23, 1999 (JP) .......................................... 11-209855

(51) Int. Cl.⁷ .............................................. A63F 13/00
(52) U.S. Cl. ................................ 463/32; 463/8; 463/31; 463/30
(58) Field of Search .............................. 467/31; 434/13, 434/16, 30, 35, 38; 463/30, 7, 8, 32

(56) References Cited

U.S. PATENT DOCUMENTS

| | | | |
|---|---|---|---|
| 5,272,652 A | * 12/1993 | Rosenshein et al. | 364/578 |
| 5,769,718 A | * 6/1998 | Rieder | 463/31 |
| 5,807,174 A | * 9/1998 | Fukuhara et al. | 463/31 |
| 6,001,017 A | * 12/1999 | Okano et al. | 463/43 |
| 6,149,523 A | * 11/2000 | Yamada et al. | 463/31 |
| 6,165,073 A | * 12/2000 | Miyamoto et al. | 463/32 |
| 6,210,273 B1 | * 4/2001 | Matsuno | 463/31 |
| 6,244,956 B1 | * 6/2001 | Nakayama et al. | 463/3 |
| 6,259,431 B1 | * 7/2001 | Futatsugi et al. | 345/157 |
| 6,273,818 B1 | * 8/2001 | Komoto | 463/31 |
| 6,283,861 B1 | * 9/2001 | Kawai et al. | 463/32 |

OTHER PUBLICATIONS

Everquest, The Ruins of Kunark, 2000, Sony Entertainment, 56–62.*
The Fourth Super Robot War, 21–22, Translation provided by applicant.*
Everquest, The Ruins of Kunark, 2000, Sony Entertainment, 56–62.*
Atricle, Multimedia Wire, Everquest Released in Beta, Jul. 22, 1998.*
A manual entitled "The Fourth Super Robot War",pp. 21–22, along with an English language translation.
"Fighting Studio 'Sega Saturn Perfect Capture Series 18 Daisenryaku—Strong Style—Capture Method to Certainly Win'" 1st edition, published by K.K. Futabasha, Jul. 10, 1997, pp. 10–11, 14, and 20, with English Language translation.

* cited by examiner

*Primary Examiner*—Jessica Harrison
*Assistant Examiner*—Corbett B Coburn
(74) *Attorney, Agent, or Firm*—Greenblum & Bernstein, P.L.C.

(57) ABSTRACT

A player is assisted in selecting an action to be executed by a character on a screen by displaying multiple options, associated with corresponding actions, on the screen. A graphic, in virtual three dimensions, is displayed on the screen to visually depict a preview of a range of effect of an action corresponding to an option selected by an operational input by the player. The position of the graphic may be based on the position of the character at the time the option is selected. The range of effect may be switched to preview another action when the player switches the selected option. The options may be represented by icons and grouped according to the types of corresponding actions.

23 Claims, 18 Drawing Sheets

Fig.5

| ATTRIBUTE | LEVEL | 1 | 2 | 3 | 4 | 5 | |
|---|---|---|---|---|---|---|---|
| ATTACK TYPE | NAME | | | | | | 93a |
| | EFFECT RANGE DATA | GUN TYPE | CYLINDER TYPE | GUN TYPE | DOME TYPE | ENTIRE SCREEN | 93b |
| | ICON IMAGE NO. | | | | | | 93c |
| | CONSUMED MP | | | | | | 93d |
| | EXP VALUE | | | | | | 93e |
| REINFORCEMENT TYPE | EFFECT RANGE DATA | GUN TYPE | DOME TYPE | GUN TYPE | ENTIRE SCREEN | ENTIRE SCREEN | |
| | ... | ... | ... | ... | ... | ... | |
| RECOVERY TYPE | EFFECT RANGE DATA | PLAYER CHARACTER | | | | | |
| | ... | ... | ... | ... | ... | ... | |
| STRENGTHENING TYPE | EFFECT RANGE DATA | PLAYER CHARACTER | ... | ... | ... | ... | |

Fig.6
| EFFECT RANGE DATA | | DISPLAYED GRAPHIC |
|---|---|---|
| TYPE | SIZE PARAMETER | |
| GUN | Rg1<br>Rg2<br>Hg | 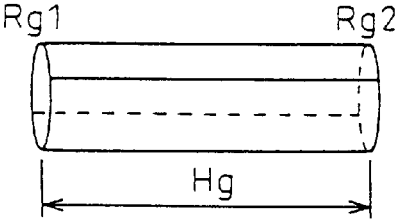 |
| CYLINDER | Rc1<br>Rc2<br>Hc | 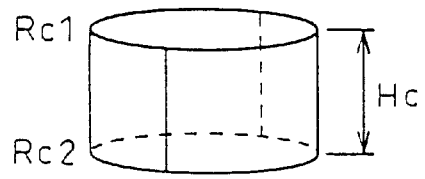 |
| DOME | Rd<br>Hd | 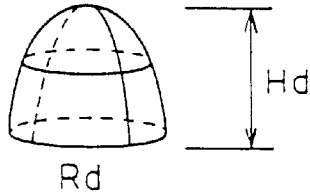 |
| ENTIRE SCREEN | — | CHANGE COLOR OF ENTIRE SCREEN EXCEPT FOR PLAYER CHARACTER |
| PLAYER CHARACTER | — | CHANGE COLOR OF PLAYER CHARACTER |

Fig.7

| HP_NOW | 56 | | | 91a |
|---|---|---|---|---|
| HP_MAX | 120 | | | 91b |
| MP_NOW | 38 | | | 91c |
| MP_MAX | 60 | | | 91d |
| EXP_NOW | 600 | | | 91e |
| EXP_MAX | 8000 | | | 91f |
| MAXIMUM LEVEL OF ACQUIRED MAGIC | ATTACK TYPE | 5 | | 91g |
| | REINFORCEMENT TYPE | 3 | | |
| | RECOVERY TYPE | 4 | | |
| | STRENGTHENING TYPE | 1 | | |
| WEAPON | HAND GUN | | | 91h |
| AMMUNITION | TYPE | BULLETS | NO. | 20 | 91i |
| DEFENSIVE GEAR | BULLET PROOF VEST | | | 91j |
| ITEM | CURATIVE, ANTIDOTE | | | 91k |

Fig. 8

| LEVEL | 1 | 2 | 3 | 4 | 5 |
|---|---|---|---|---|---|
| ATTACK TYPE | | | | | |
| REINFORCEMENT TYPE | | | | | |
| RECOVERY TYPE | | | | | |
| STRENGTHENING TYPE | | | | | |

EXP 600/8000 ~992

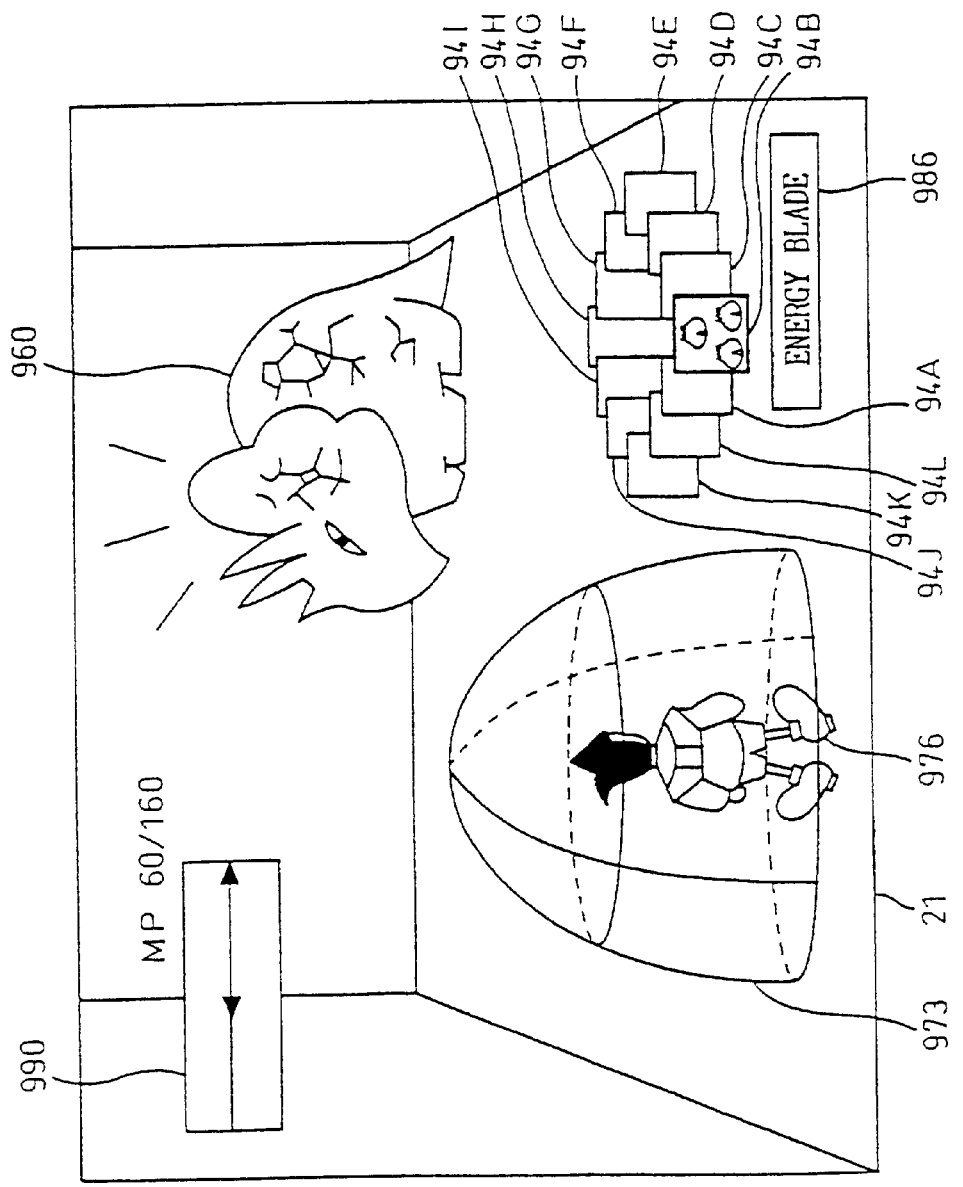

METHOD OF ASSISTING SELECTION OF ACTION AND PROGRAM PRODUCT AND GAME SYSTEM USING SAME

BACKGROUND OF THE INVENTION

1. Field of the Invention

The present invention relates to a method of assisting selection of an action which assists a player selected action of a virtual person called a "character" displayed on a game screen and a program product and game system using the same.

2. Description of the Related Art

In recent years, game programs have been developed using sophisticated technology. Some of these game programs are for role playing games enabling a player to enjoy a fight between a virtual person called a "player character" positioned in a three-dimensional virtual space and one or more other virtual persons called "enemy characters". Some of these programs enable a player to select a weapon, defensive gear, or magic to be used by the player character when making the player character execute an attack on an enemy character. If this type of game program is used, the player can enjoy the game in the manner he or she desires.

In particular, magic enables an attack not possible by a weapon or a defense, so games using magic offer much more variety than a conventional type of game program using only weapons. Therefore, developers of game programs tend to develop game programs using more magic. This magic sometimes includes a plurality of types of magic effective for an enemy character and a plurality of types of magic effective for a player character. Further, the range of actual effects of magic effective for an enemy character (range of effects) sometimes differs from that of a player character depending on the type of the magic.

Summarizing the problems to be solved by the invention, the possible range of attack by a weapon can be the range of effect of the weapon or the range of effect of action using that weapon. The range of effect of a weapon differs depending on the weapon. In the case of a usual weapon, however, a player can easily determine the range of effect of the weapon from the name of the weapon. Therefore, selection of the desired weapon by a player in a fight scene is usually easy. In the case of magic, however, special names are usually given. Further, the name of the magic usually has nothing at all to do with the range of effect of the magic. Therefore, when the player does not remember the range of effect of the magic, the player sometimes cannot judge if magic is effective for the player character or effective for an enemy character by just looking at the name of the magic and sometimes cannot intuitively determine the range of effect of the magic.

SUMMARY OF THE INVENTION

An object of the present invention is to provide a method of assisting selection of action which assists a player obtaining an intuitive grasp of the range of effect of action when the player is selecting action which the player wants a character to execute from among a plurality of actions, such as magic, which the character can execute, and a program product and game system using the same.

According to a first aspect of the present invention, there is provided a method of assisting selection of action for assisting a player in selecting one of a plurality of actions which a character on a screen can execute. The method includes displaying a plurality of options linked with the plurality of actions on the screen and previewing the range of effect of an action corresponding to an option selected by operational input by the player from among the plurality of displayed options. In this context, previewing the range of effect of action on the screen means to display the range of effect on the screen regardless of whether actual execution of that action will occur.

The present invention achieves a function of previewing the range of effect of action, that is, displaying the range of effect of action before execution of the action to enable the range of effect of action to be checked before the player selects the action to be executed by the character. As a result, the player can determine the differences in the ranges of effect of various actions.

In the present invention, the method further comprises shifting from the state of previewing the range of effect of action on the screen to execution of action corresponding to the selected option (action) in response to an operational input by the player. Further, the method further comprises, in the previewing state, switching the range of effect of action previewed each time by switching the option selected by the operational input by the player. Further, the plurality of options preferably are comprised of a plurality of icons corresponding to a plurality of actions. Further, the plurality of icons may be divided into a plurality of groups of icons and, in displaying the options, one group of icons among the plurality of groups of icons may be displayed on the screen and the displayed group of icons may be switched to another group of icons in response to an operational input by a player. More preferably, the method further comprises determining the range of effect of action based on the position of the character and, in the previewing state, displaying a graphic expressing the determined range of effect of action on the screen. Further, the previewing preferably displays the area of effect of the action in the virtual space in which the character is positioned as the range of effect of action and displays the graphic positioned in the virtual space on the screen.

By using the method of assisting selection of action of the present invention, a player can easily select action having a desirable range of effect from among the plurality of actions able to be executed by a character on the screen.

According to a second aspect of the present invention, there is provided a program product that stores a program for a video game to be executed by a computer, the program making the computer display on the screen a plurality of options linked with a plurality of actions able to be executed by a character on a screen and preview the range of effect of an action corresponding to an option selected by operational input by a player from among the plurality of displayed options.

According to this aspect of the present invention, it is possible to obtain a program product storing a program enabling a player to easily select an action having a desirable range of effect from among the plurality of actions able to be executed by a character on the screen during the game.

According to a third aspect of the present invention, there is provided a game system for executing an action selected by a player among a plurality of actions which a character on a screen can execute, comprising a means for displaying a plurality of options linked with the plurality of actions on the screen and a means for previewing the range of effect of an action corresponding to an option selected by operational input by the player from among the plurality of displayed options.

According to this aspect of the present invention, it is possible to obtain a game system enabling a player to easily select an action having a desirable range of effect from among the plurality of actions able to be executed by a character on the screen during the game.

According to a fourth aspect of the present invention, there is provided a game system used along with a display device for displaying an image of a game and an input device for inputting an operation by a player, provided with a computer programmed so as to display on the screen graphic information showing the range of effect of action designated by operational input by the player from the input device of the plurality of actions able to be executed by a character on the screen.

The present disclosure relates to subject matter contained in Japanese Patent Application No. HEI 11-209855, filed on Jul. 23, 1999, the disclosure of which is expressly incorporated herein by reference in its entirety.

BRIEF DESCRIPTION OF THE DRAWINGS

These and other objects and features of the present invention will become clearer from the following description of the preferred embodiments given with reference to the attached drawings, in which:

FIG. 5 is a view of the content of a magic information table used in the game console;

FIG. 6 is a view explaining a range of effect of various types of magic used in the game console;

FIG. 7 is a view of the content of a player character table used in the game console;

FIG. 8 is a schematic view of examples of images of a plurality of groups of icons corresponding to a plurality of groups of magic used in the game console;

FIG. 18 is a second view of an example of a display screen in the second embodiment.

DESCRIPTION OF THE PREFERRED EMBODIMENTS

Preferred embodiments of the method of assisting selection of action according to the present invention and the program product and game system using the same will be explained below with reference to the drawings.

First Embodiment

Figure 1:
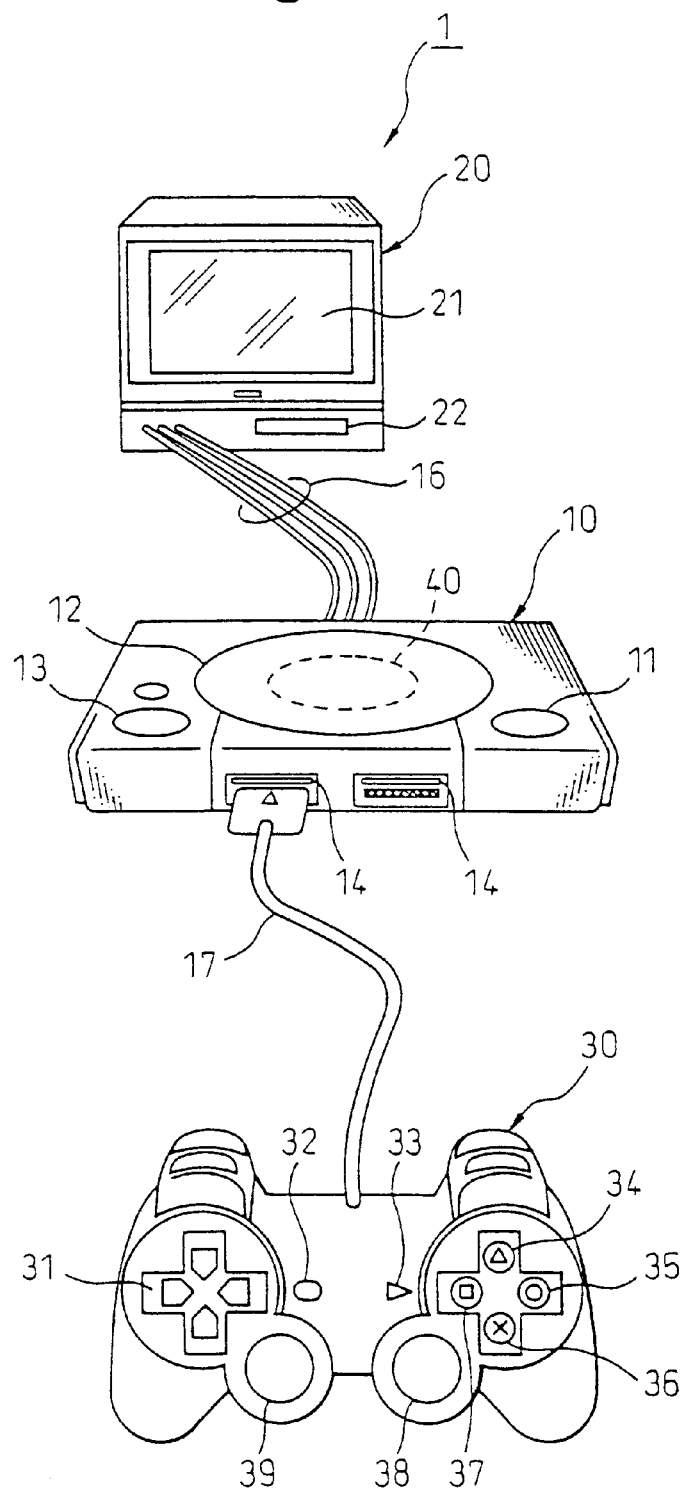
FIG. 1 is a schematic view of a game system using a game console with a built-in computer.

As shown in FIG. 1, the game system 1 comprises a game console 10 able to be loaded with a CD-ROM 40 storing a computer game program, a display device 20, and an input device 30 able to be operated by a player. The game console 10 includes a built-in computer. A player pushes a button 11 on the game console 10 to open a lid 12 and inserts a CD-ROM 40. Next, the player pushes the power button 13. The game console 10 starts to execute a computer game program recorded on the CD-ROM 40. The display device 20 is connected to the game console 10 by a cable 16, while the input device 30 is connected to it by a cable 17. The game console 10 has two card slots 14. Two input devices 30 may be connected to the game console 10. The two card slots are for use together with these two input devices. In addition, an external supplementary program product, that is, a memory card 50, may be inserted into a card slot. When the player stops the game in the middle of play, the data relating to the player character and the enemy characters, the data relating to the state of progress of the game program, and other data necessary for resuming the game are stored in the memory card 50 inserted into the card slot. When the player later uses the memory card to restart the game, the game console 10 restarts the game from the interrupted location.

The display device 20 receives a video signal and audio signal from the game console 10. The display device 20 displays a picture on the screen 21 based on the received video signal, while speakers 22 attached to the display device 20 output sound based on the received audio signal. The screen 21 and the speakers 22 are for example, together comprised by a TV set.

The input device 30 is also known generally as a controller and has a plurality of buttons and other operating portions for operation by the player. For example, reference numeral 31 is a group of directional keys comprised of four directional keys for moving the cursor displayed on the screen 21 to the left, right, up, and down. Reference numeral 32 is a select button, while 33 is a start button. Reference numerals 34, 35, 36, and 37 are a first function button, a second function button, a third function button, and a fourth function button. Reference numerals 38 and 39 are a right stick and left stick, respectively. The input device 30 is provided with other not shown buttons or other buttons or display lamps not illustrated here for simplification. Note that the game system using the present invention is of course not limited to the one illustrated or to game systems similar to the same.

Figure 2:
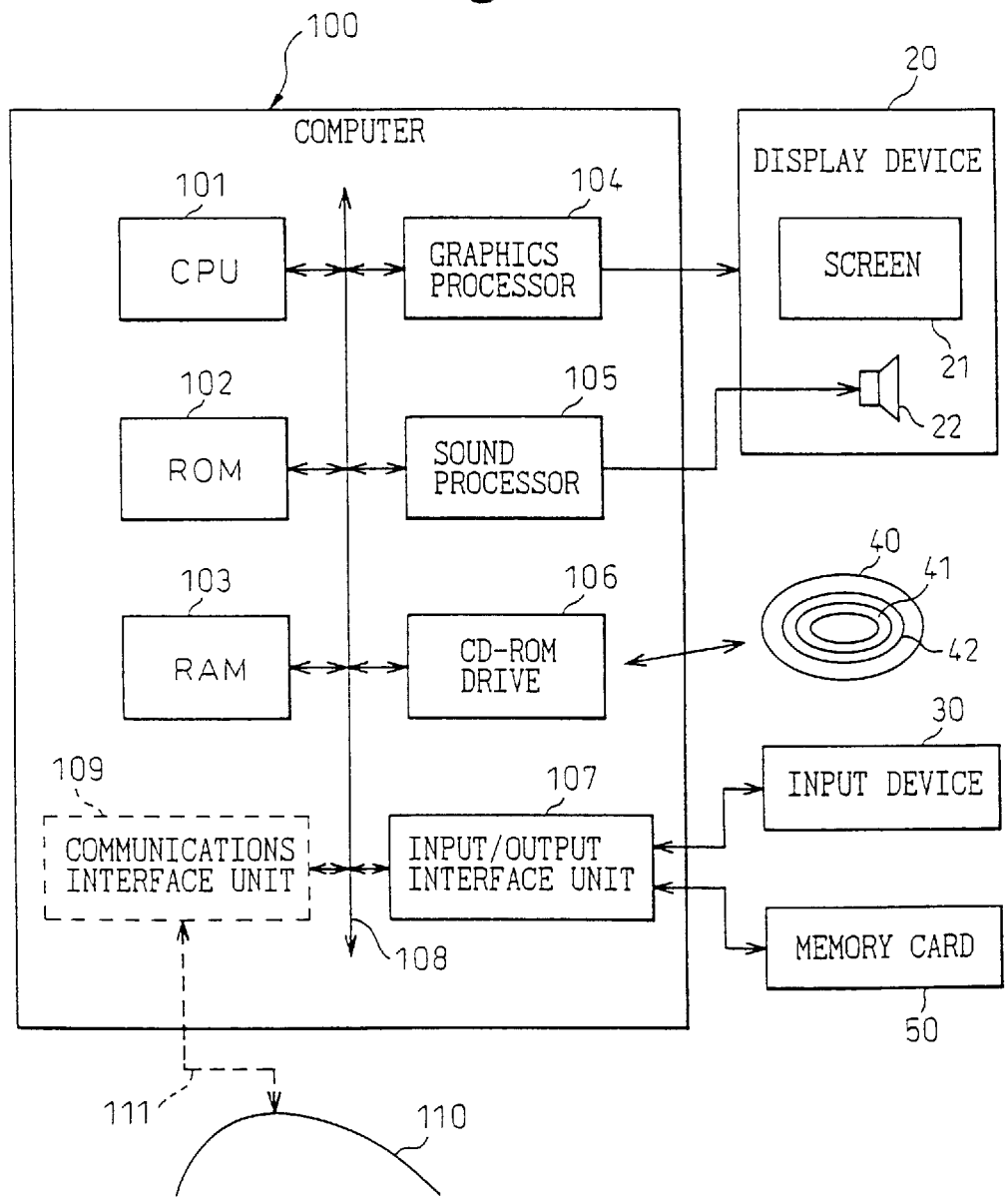
FIG. 2 is a schematic block diagram of a computer in the game console according to the present invention.

The computer 100 making up part of the game console 10 is, as explained in FIG. 2, for example comprised mainly of a central processing unit (CPU) 101, a read only memory (ROM) 102 for storing a series of instructions and data required for the CPU 101 to execute program instructions, a random access memory (RAM) 103 for temporarily storing the game program to be executed and the data used by the program and comprising a main memory, a graphic processor 104, a sound processor 105, a CD-ROM drive 106 in which a CD-ROM 40 may be loaded, an input/output interface unit 107, and a bus 108 connecting the above circuits.

The CPU 101 decodes and executes the program instructions stored in the RAM 103, controls the circuits in the computer in accordance with the instructions, and controls the execution of the program so as to execute parts of the program corresponding to operational input by a player from the input device 30 through the input/output interface unit 107 in response to that operational input. The CPU 101 suitably executes the series of instructions stored in the ROM 102 when executing the program instructions.

The graphic processor 104 includes a not shown video RAM (VRAM) and constitutes a frame buffer inside it. It draws an image comprised of polygons in the frame buffer in response to an instruction given from the CPU 101. Further, the graphic processor 104 generates a video signal in accordance with the image data stored in the frame buffer, for example, a television signal, and outputs it to the display device 20. The sound processor 105 generates an audio signal expressing music, sound effects, etc. based on audio data stored in the RAM 103 and supplies it to speakers 22 attached to the display device 20. The input/output interface unit 107 is connected to the input device 30 and the memory card 50 inserted in the card slot 14 (FIG. 1) and controls the timing of the transfer of data between these and the CPU 101 and other circuits. Note that the computer comprising part of the game console according to the present invention is of course not limited to the one illustrated or to computers similar to it. The CD-ROM 40 is a program product storing a game program 41 for making the computer 100 execute the processing according to the first embodiment and the data 42 used by the same. The CD-ROM drive 106 reads the game program along with the data, stores them in the RAM 103, and uses them for execution by the CPU 101.

Figure 3:
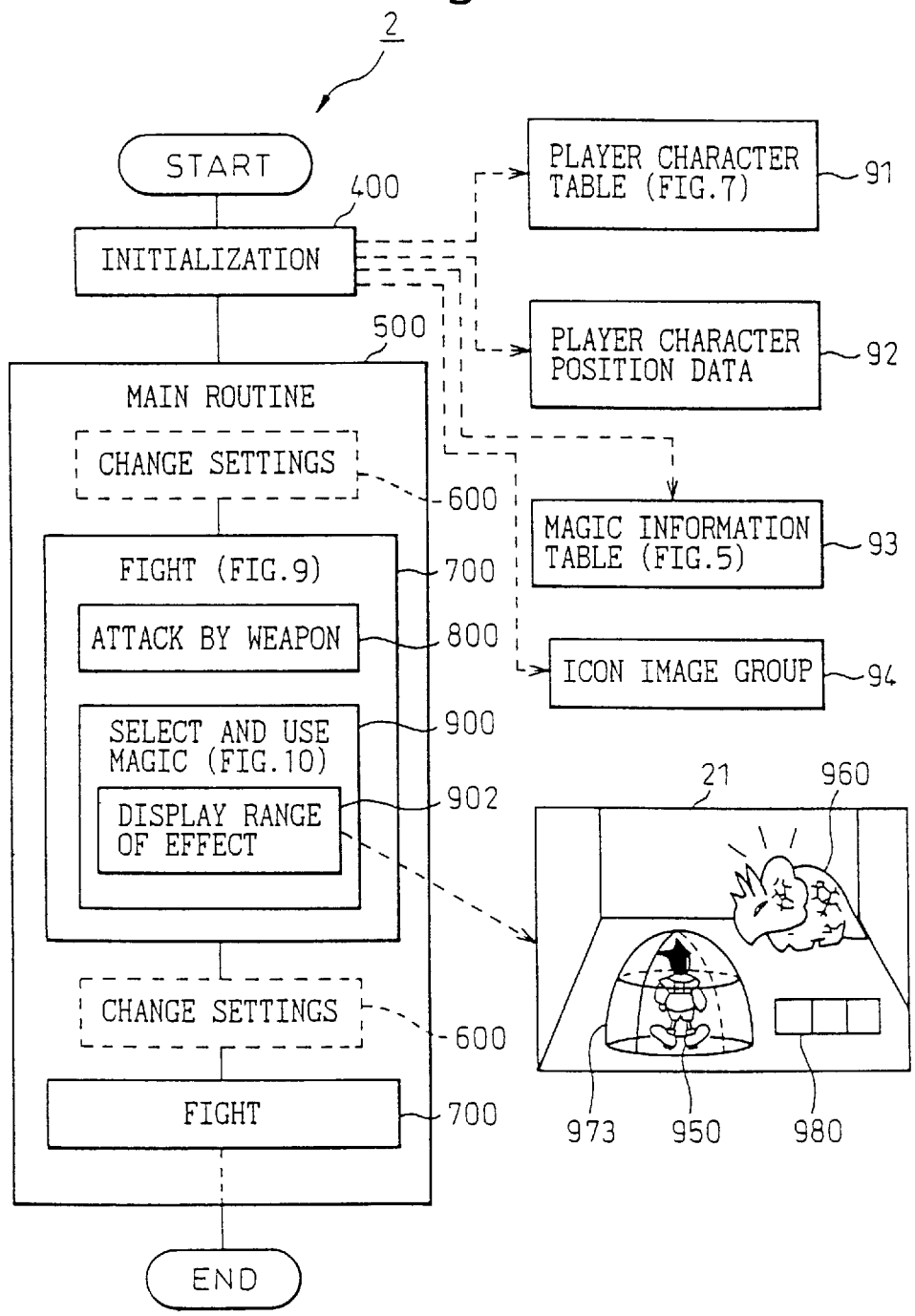
FIG. 3 is a schematic flow chart of a program executed by the game console.

As shown in FIG. 3, a typical example of the game program 2 able to be used in the first embodiment of the invention includes an initialization routine 400 and main routine 500. The main routine 500 includes a plurality of fight routines 700. When the player instructs suspension of the game when the game ends in the middle of a fight routine or at the end of any of the fight routines 700 or when all of the processing of the main routine finishes being executed, the main routine 500 ends. Note that the above program is an example of a program which can use the present invention. The present invention is of course not limited to the above program or to similar programs.

In the initialization routine 400, the various data recorded on the CD-ROM 40 is suitably stored in the RAM 103. As the data especially related to the present invention, for example, the initial values of the player character table 91, positional data 92 of the player character, and magic information table 93 are produced in accordance with the data in the CD-ROM 40 and stored in the RAM 103. The group of icon images 94 is also produced and stored in the RAM 103 in accordance with the group of icon images recorded on the CD-ROM 40.

Before or after execution of each fight routine 700, the setting change routine 600 can be actuated by operational input by the player. When the setting change routine 600 is actuated, the weapons, magic, etc. which the player is considering having the player character use in the succeeding fight routine are updated. That is, the player can increase the types of magic which the player character can use during a fight and can change the weapons etc., with which the player character is equipped, to other weapons etc. In the first embodiment, however, it is assumed that the player cannot increase the number of weapons which the player character can use.

The fight routine 700 includes a weapon attack step 800 for having a player character attack an enemy character with a weapon it is equipped with and a magic selection and use routine, characteristic of the present invention, for selection and use of magic. There is also a routine for selection of weapons, special items, and other fighting gear, but this is not shown here for simplification. The weapon attack step 800 and the magic selection and use routine 900 are both executed along with operational input by the player.

In the magic selection and use routine 900, a player can select one type of magic which he/she wants the player character to use from among the one or more types of magic which the player character can use at that time. If the player does not have accurate knowledge relating to the magic, he/she can no longer select the suitable magic. The player therefore must judge if each type of magic is effective for an enemy character or effective for the player character. Further, since the range of effect of each magic differs, even among magic effective against an enemy character, by knowing the range of effect of each magic, the player can select the magic effective at the time for an enemy character and can cut down on the waste involved in selection of the ineffective magic.

Therefore, in the magic selection and use routine 900 according to the present invention, the effect range display processing 902 is executed and the range of effect of each action is displayed on the screen regardless of if the magic is actually used. That is, the range of effect of magic is previewed on the screen. This assists a player to obtain an intuitive grasp of the range of effect of selected magic when it selects magic to be used by the player character. Specifically, in the first embodiment, the group of icons 980 corresponding to the group of magic is displayed on the screen 21 and a graphic 973 showing the area of effect of magic in a virtual space in which the player character 950 is positioned is displayed as the range of effect of magic corresponding to the icon designated by the player on the screen 21 when the player character 950 and enemy character 960 are displayed. The range of effect is displayed without use of the magic. FIG. 3 shows the screen displaying the graphic 974 showing a dome type area of effect as one example. Each time a player designates a different icon, the range of effect of the corresponding magic is displayed. Further, the player can confirm the range of effect of the magic on the screen before using the magic. The player instructs the use of the magic to the-game console when deciding on the magic to be used. In other words, the first embodiment provides a so-called preview function of the range of effect of magic, that is, a function of displaying the range of effect of magic on the screen before use of the magic and enabling the player to identify differences in the various ranges of effect of magic before selecting the magic which the player character is made to use.

The program, including the above magic selection and use routine, is executed by the CPU 101 by suitable use of the other circuits in the computer 100. Various functions to be realized by the computer are realized by the CPU. As will be clear from the following explanation, these functions include an option display function, a preview function, and other functions. Therefore, the CPU 101 realizes the option display means, preview means, and other functional means in cooperation with the ROM 102, RAM 103, and graphic processor 104.

Details of the execution of the above game program are set forth below.

Figure 4:
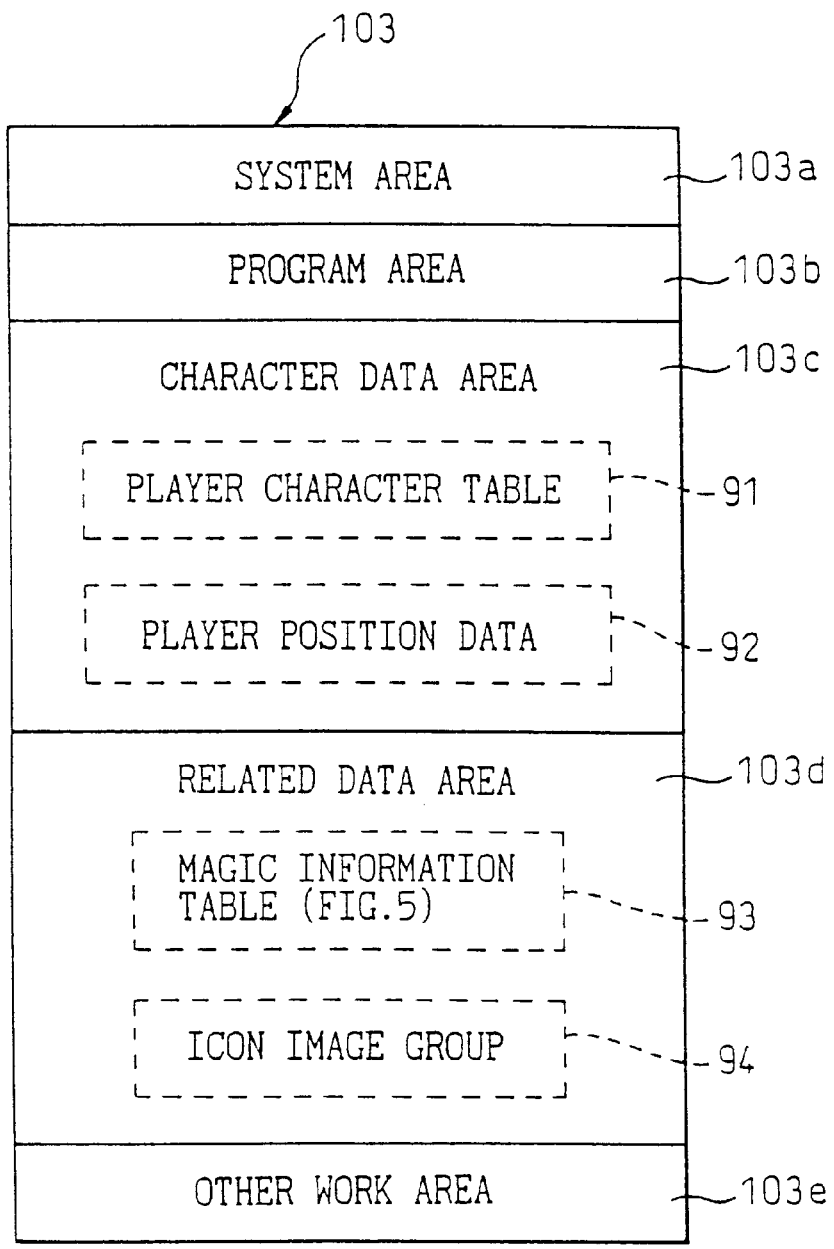
FIG. 4 is a view of an example of a memory map of a RAM in the game console.

The RAM 103 is used in accordance with the memory map shown in FIG. 4 at the time of execution of the program. The system area 103a stores system information such as an interruption vector showing where an interruption routine jumps to. A program area 103b stores the portion of the game program being executed. A character data area 103c stores data relating to the player character and the enemy characters and other characters appearing in the game. The initial values of the above-mentioned player character table 91 and player character positional data 92 are stored in the character data area 103c by the initialization routine 400. Similar data relating to one or more enemy characters is also stored in this area, but this is not shown here for simplification. A related data area 103d stores other related data used for execution of the game program. The above-mentioned magic information table 93 and icon image group 94 are stored in the related data area 103d by the initialization routine 400. The other work area 103e is used as a work area for temporarily holding other data at the time of execution of the game program.

The magic able to be used in the first embodiment of the present invention is for example divided into a plurality of groups of magic based on the attributes of the magic. These groups of magic include for example an attack type group of magic, a reinforcement type group of magic, a recovery type group of magic, and a strengthening type group of magic. The attack type group of magic is comprised of a plurality of types of magic with different ranges of effect to be used on an enemy character for stopping action by the enemy character. The reinforcement type group of magic is comprised of a plurality of types of magic with different ranges of effect to be used on an enemy character to, for example, slow the movement of the enemy character. The recovery type group of magic is comprised of a plurality of types of magic for restoring, by different values, the magic points showing the amount of magic which a player character can used. The strengthening type group of magic is comprised of a plurality of types of magic used by an enemy character on a player character for weakening, by different values, the power of the magic used on a player character. Each of the plurality of magic belonging to each group of magic is assigned a level of 1 to 5. In the same group of magic, there is only one magic of each level. It is assumed that the same player character can successively acquire a plurality of types of magic belonging to the same group of magic from the smallest level up. The same player character can acquire a plurality of types of magic belonging to different groups of magic. Each type of magic is assigned one icon image in the group of icon images 94 stored in the RAM 103 for use when selecting magic.

As shown in FIG. 5, the magic information table 93 stored in the RAM 103 by the initialization routine 400 (FIG. 3) includes data relating to each of the plurality of types of magic able to be used in the first embodiment of the present invention. The data relating to each magic includes the name 93a of magic and the effect area data 93b showing the area in the game virtual space which the magic affects. The magic belonging to either the attack type or the reinforcement type is effective against an enemy character. For this type of magic to become effective with respect to an enemy character, it is assumed that the enemy character has to be present in a predetermined spatial area as seen from the player character. For this type of magic, this predetermined spatial area seen from the player character is the range of effect of the magic. This spatial area is also referred to as an area of effect.

The range of effect of magic differs for each type of magic. In the first embodiment of the present invention, the shape of the attack type or reinforcement type magic is one of the gun type, cylindrical type, dome type, or entire screen. The effect area data for this type of magic includes size parameter data showing the size of the area of effect. The recovery type or strengthening type magic is effective against the player character itself. The range of effect of the magic is the player character itself.

FIG. 6 shows size parameters used for each of the various types of areas of effect able to be used in the first embodiment and graphics displayed when the areas are displayed on the screen as areas in the virtual space when selecting magic, as explained later.

The gun type area of effect is a tubular area with circles of radii $Rg1$, $Rg2$ positioned at the two ends and having a finite length of the length $Hg$. When the values of $Rg1$ and $Rg2$ are different, the area becomes frustoconical in shape. Here, for simplification, in this case as well, this is sometimes called a finite length tubular area. When this area of effect is displayed on the screen as a graphic in a virtual space at the time of selection of magic as explained later, the area of effect is displayed by a tubular skeletal graphic as shown in, e.g., FIG. 12. The center line of this tubular skeletal graphic starts from a predetermined reference point of the player character, for example, a point at the approximate center of the face. The position of the tubular skeletal graphic in the virtual space is determined based on the position of the player character so as to be parallel with the horizontal plane of the virtual space in which the player character is positioned and extend in a direction away from the player character. This skeletal graphic is comprised of a pair of ellipses expressing the two end surfaces, a pair of ridge lines connecting them, and a pair of center lines positioned between the pair of ridge lines. This skeletal graphic is displayed in a specific color, for example, green. The point of use of a skeletal graphic as the graphic showing the area of effect is the same for graphics showing other ranges of effect as well. By using a skeletal graphic, the player can easily understand the positional relationship with another graphic on the screen. The point of display of the skeletal graphic in a specific color is the same for other skeletal graphics as well.

The cylindrical type area of effect is a cylindrical area with circles of radii $Rc1$, $Rc2$ positioned at the two ends and having a finite length of the length $Hc$. When the values of $Rc1$, $Rc2$ are different, the area becomes frustoconical in shape. Here, for simplification, in this case as well, this is sometimes called a finite length cylindrical area. When this area of effect is displayed on the screen at the time of selection of magic as explained later, the area of effect is displayed by a cylindrical skeletal graphic as shown in the figure. This skeletal graphic is comprised of a pair of ellipses expressing the two end surfaces, a pair of ridge lines connecting them, and a pair of sectional lines positioned between the pair of ridge lines. When displaying this cylindrical skeletal graphic in virtual space, the position of the cylindrical skeletal graphic in the virtual space is determined based on the position of the player character so that the bottom of the cylindrical skeletal graphic is positioned on the horizontal plane of the virtual space in which the player character is positioned and the center of the bottom is positioned at the location of the feet of the player character.

The dome type area of effect is a dome type area with a circle of a radius $Rd$ at the bottom and having a height $Hd$. When this area of effect is displayed on the screen at the time of selection of magic as explained later, the area of effect is displayed by a dome type skeletal graphic as shown, e.g., in FIG. 13. This dome type skeletal graphic is comprised of an ellipse representing the bottom of the dome, a pair of ridge lines of the dome, and a pair of lines of the dome positioned between them. The position of the skeletal graphic in the virtual space is determined based on the position of the player character so that the bottom of the dome type skeletal graphic is positioned on the horizontal plane of the virtual space in which the player character is positioned, the center of the bottom is positioned at the location of the feet of the player character, and the center line of the dome becomes perpendicular to the horizontal plane.

When the area of effect is the entire screen, the entire screen minus the player character is displayed in a specific color, for example, green. In the first embodiment, the screen is also considered to show a graphic showing the area of effect. When the area of effect is the player character itself, the player character itself is displayed in a specific color, for example, green. In the present embodiment, the image is also considered a graphic showing the area of effect.

Returning to FIG. 5, the magic information table 93 also stores ID nos. 93c of icon images assigned to the magic. When using one of the types of magic during a fight, a point value of the player character called "magic points MP" is consumed. The magic information table 93 stores the consumption 93 of the magic points MP when using magic as data relating to the magic. Similarly, when a player character acquires any magic, a point value of the player character called an "experience value EXP" is consumed. Here, an "experience value" is a point value obtained by a player character winning a fight with an enemy character. The magic information table 93 stores the consumption 93e of the experience value EXP when acquiring magic as data relating to the magic.

FIG. 7 shows various data in the player character table 91 stored in the RAM 103 by the initialization routine 400 (FIG. 3). The initialization routine 400 sets the initial values of the data.

The player character table 91 includes the current values of various point values held by a player character and the maximum values of the point values. For example, HP_NOW (91a) and HP_MAX (91b) are the current value and maximum value of the point value called the hit points HP. The "hit point" is a parameter expressing the physical strength of the player character. The hit points are reduced by an attack from an enemy character during a game. Further, the hit points are increased by a predetermined recovery operation of the player character. In the example of FIG. 7, the hit points HP_NOW (91a) of the player character at the current time are "56", and the maximum value HP_MAX (91b) of the hit points is "120". MP_NOW (91c) and MP_MAX (91d) are the current value and maximum value of the magic points MP. In the example of FIG. 7, the magic points MP_NOW (91c) of the player character at the current time are "38", and the maximum value MP_MAX (91d) of the magic points is "60". EXP_NOW (91e) and EXP_MAX (91f) are the current value and maximum value of the above experience value EXP. In the example of FIG. 7, the experience value EXP_NOW (91e) of the player character at the current time is "600", while the maximum value EXP_MAX (91f) of the experience value is "8000". The data 91a, 91c, and 91e relating to the current values of the plurality of points are later automatically updated during the execution of the fight routine 700 when the main routine 500 is executed and one of the fight routines 700 is executed.

The player character table 91 also stores the maximum level 91g of the magic belonging to the group of magic which the player character has already acquired for each group of magic. In the example of FIG. 7, the level for each attribute of magic which the player character has acquired is "5" for the level of the attack type magic, "3" for the level of the reinforcement type magic, "4" for the level of the recovery type magic, and "1" for the level of the strengthening type magic. The player character table 91 also includes data relating to the various items which the player character can use, if selected by the player, for example, the weapons data 91h, data 91i relating to the type and amount of ammunition, defensive gear data 91j, item data 91k, etc. The weapons data 91h shows the weapons the player character is equipped with. In the example of FIG. 7, the player character is equipped with a hand gun. The data 91i relating to the types and amount of ammunition shows the type and amount of ammunition loaded in the weapon the player character is equipped with. In the example of FIG. 7, 20 bullets are loaded as ammunition. The defensive gear data 91j shows the defensive gear the player character is equipped with. In the example of FIG. 7, the player character is shown equipped with a bulletproof vest. The item data 91k shows the special items which the player character has. In the example of FIG. 7, the player character has a curative and antidote. Note that in the first embodiment of the present invention, in the initialization routine 400, a predetermined weapon is set as the weapon etc. used by the player character in the weapon data area 91h in the player character table 91. Further, predetermined magic is set as the magic used by the player character in the magic data area 91g. The data 91g relating to the magic or the data 91h to 91k relating to the weapons etc. are updated when the player calls the setting change routine 600 in the main routine 500 and is updated when updating the magic or weapon used by the player character. At this time, the current value EXP_NOW (91e) of the experience value is simultaneously updated.

The setting change routine 600 will be explained briefly below.

Before or after execution of any fight routine 700, when the player presses a specific operational key, for example, the second function button 35 (FIG. 1), the setting change routine 600 is called. In this routine, a plurality of menu options showing the weapons, magic, etc. able to be set by the player are displayed on the screen of the display device 20. When the player uses the group of directional keys 31 to select a menu option showing for example a weapon, processing is started for changing the setting relating to the weapon. On the other hand, when the player selects a menu option showing magic, processing is started for changing the setting relating to the magic. In this processing, first, the icon images corresponding to all of the magic which can be used in the game program being executed among the group of icon images 94 in the RAM 103 are used to display a plurality of icons corresponding to the magic. As shown in FIG. 8, the group of icons corresponding to the plurality of types of magic belonging to each group of magic are arranged in the same row and displayed arranged in order of the lower level of magic on upwards. In the figure, the box around an icon for magic already acquired for a player character in the icons is shown by a broken line, while the box around an icon for other magic is shown by a solid line. In the actual display, the box may be displayed by different colors rather than by a broken line and solid line. Note that the screen also displays the combinations 992 of the current values and maximum values of the experience value EXP.

Here, it is assumed that the player can acquire only magic having a level following (i.e., higher than) the level of magic already acquired in the same group of magic. Therefore, the player mainly considers from which group of magic to acquire magic and selects magic of the lowest level in the group of magic still not acquired. In the same way, it is assumed that the player can successively select a plurality of types of magic from different groups of magic or the same group of magic. In this method of acquisition of magic, the player selects the magic without much regard as to what kind of range the range of effect of each magic is. Therefore, in the first embodiment, in the setting change routine, there is no display of the range of effect of magic as executed in the fight routine. Note that as explained in relation to the modifications later, it is also possible to have the setting change routine display an image showing a simplified range of effect and to use this routine to assist the player to select the magic.

Figure 9:
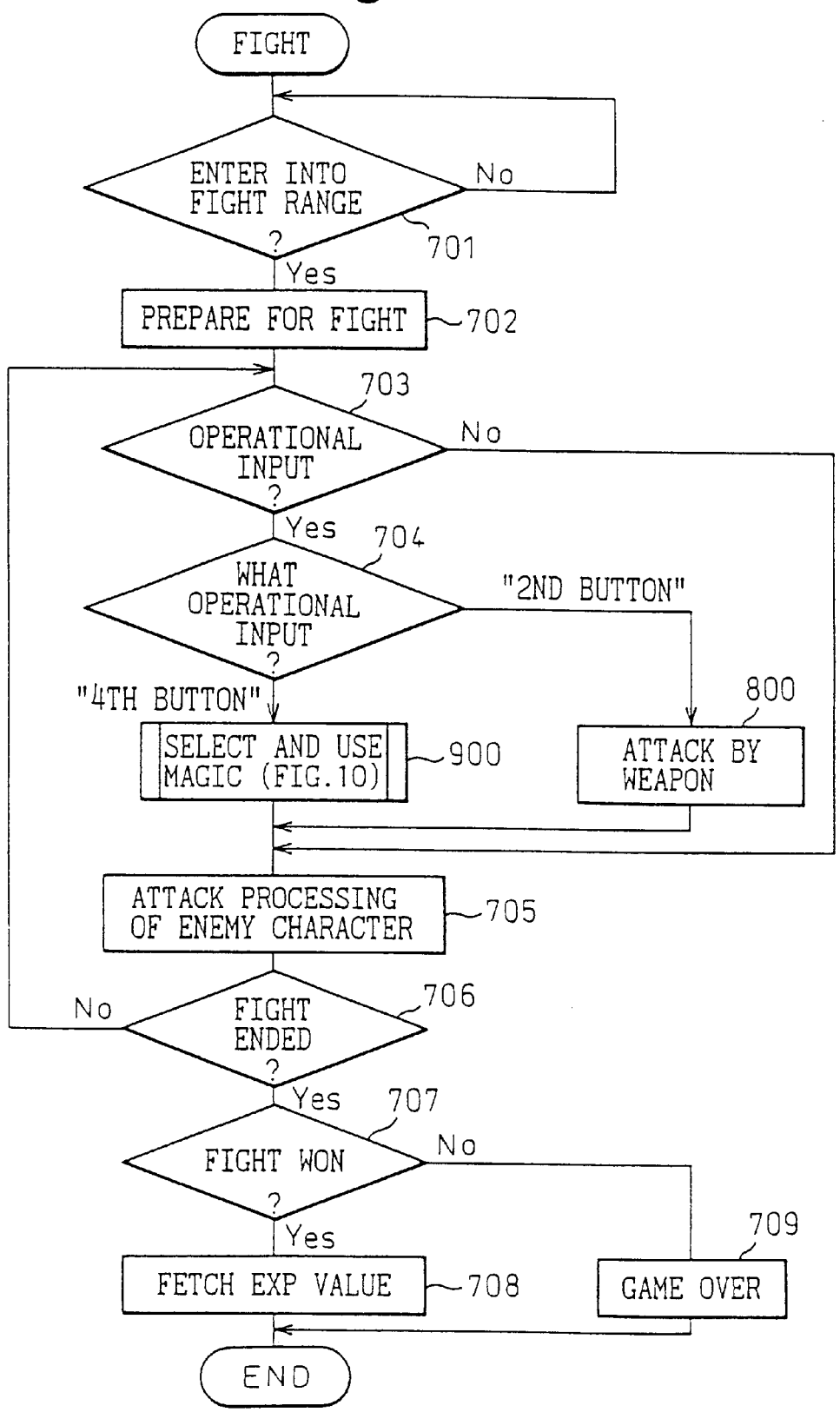
FIG. 9 is a schematic flow chart of a fight routine in the above program.

Referring to FIG. 9, in each fight routine 700, it is repeatedly checked if an enemy character has entered the fight range as seen from the player character (step 701). When an enemy character has entered the fight range, preparations for the fight are made such as the acquisition of information relating to the player character and enemy character participating in the fight (step 702). When a predetermined time then elapses without an operational input of the player (step 703), the attack on the enemy character is executed (step 705). If there is operational input by the player (step 703), the type is judged (step 704) and the weapon attack step 800 or magic selection and use routine 900 is executed according to that type.

In the enemy character attack processing (step 705), the enemy character is made to execute a predetermined action for attacking the player character. The above processing is repeated until it is judged that the fight has ended (step 706). When the fight ends in a win (step 707), the current experience value EXP_NOW of the player character is increased by exactly a predetermined value (step 708) and the fight routine 700 ends. If the fight ends in a loss, the game over processing 709 is executed, the fight routine 700 ends, and the main routine 500 ends.

When it is judged that the player has depressed a predetermined button for attack by a weapon, for example, the second function button 35 (step 704), the weapon attack step 800 is executed. There, an attack on the enemy character is executed using the weapon with which the player character is equipped (step 800).

When there is at least one type of magic already acquired by the player character and the player desires to use magic instead of a weapon, the magic used by the player character is selected in the following way. The player depresses a predetermined button for selection of magic, for example, the fourth function button 37. When it is judged that the operational input is this button (step 704), the magic selection and use routine 900 is executed. The magic selection and use routine 900 assists the player to select magic by displaying a group of icons corresponding to the plurality of magic on the screen as options for selection of magic and displaying the range of effect of magic corresponding to any icon among them.

A plurality of groups of icons are linked with the plurality of groups of magic which can be used in the game. Here, as shown, for example, in FIG. 8, four groups of icons are linked with the attack type group of magic, reinforcement type group of magic, recovery type group of magic, and strengthening type group of magic in that order.

Figure 10:
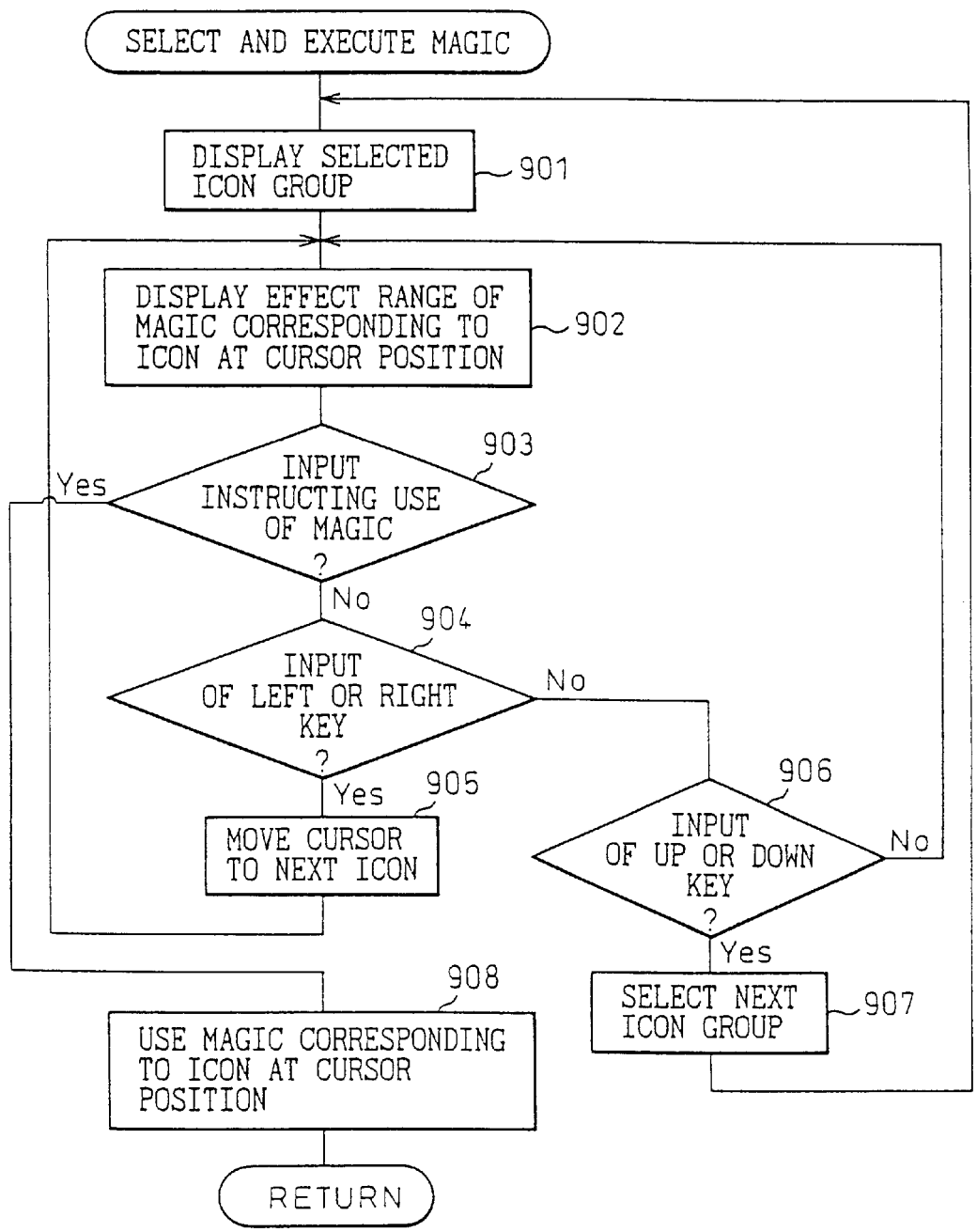
FIG. 10 is a schematic flow chart of a magic selection routine executed in the above fight routine.

As shown in FIG. 10, in the magic selection and use routine 900, the icon group display step 901 is executed for displaying the selected group of icons on the screen as options. When the icon group display step 901 is first executed, the initial group of icons, in this example, the attack type group of icons, is displayed as the selected group of icons. In the icon group display step 901, however, only the icons for the magic already acquired for the player character are displayed.

Figure 11:
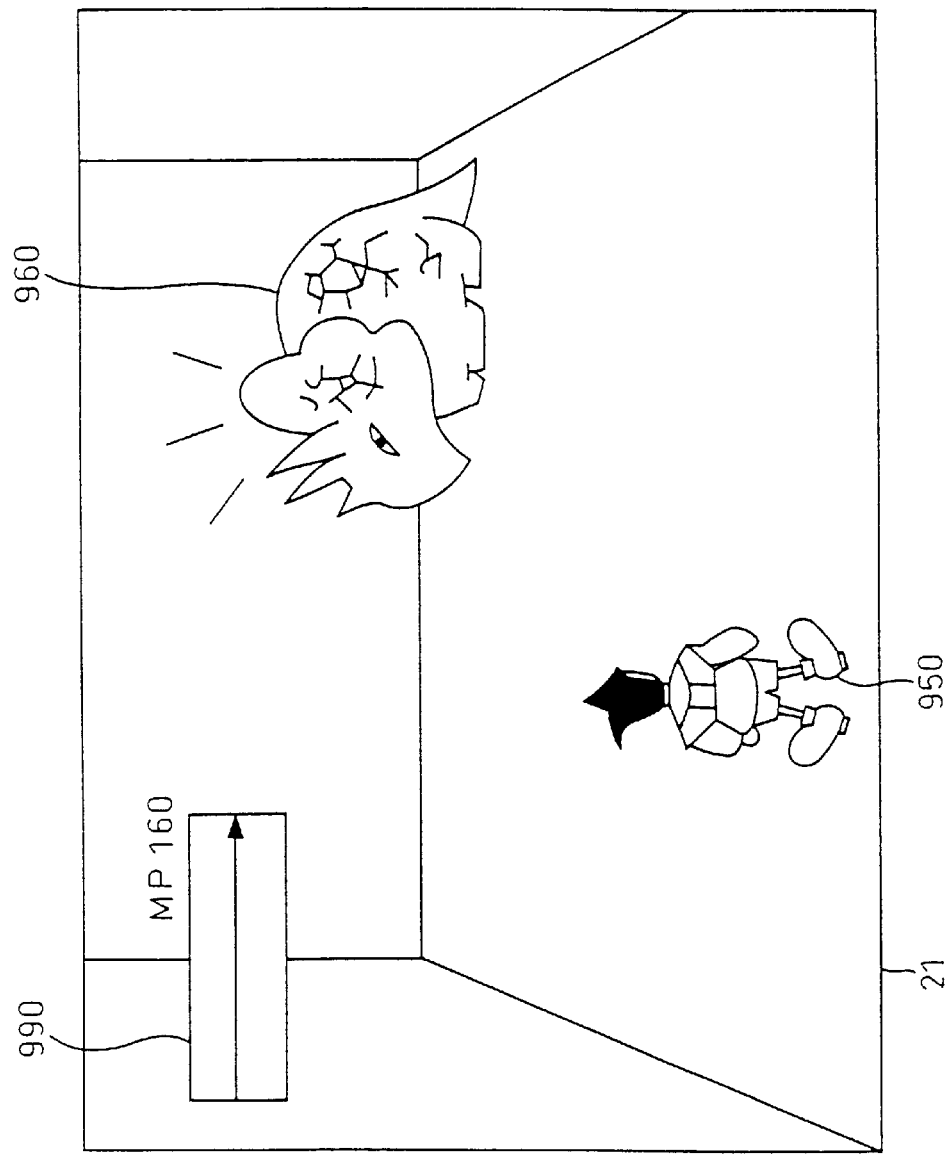
FIG. 11 is a schematic view of an example of a screen immediately before execution of the magic selection routine according to the invention in the above game system.
Figure 12:
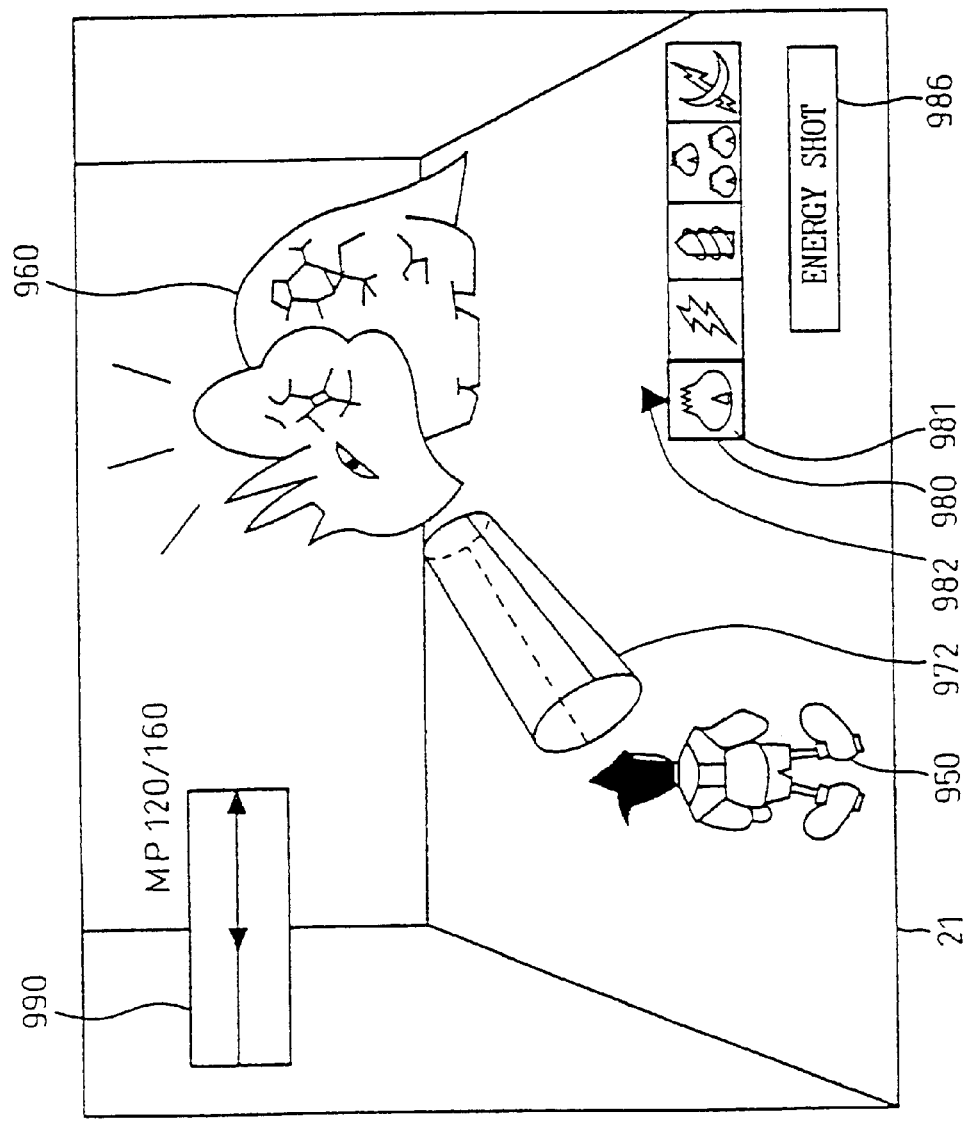
FIG. 12 is a schematic view of an example of a screen displaying a group of icons for magic selection and an area of effect of magic displayed when executing the magic selection routine according to the invention in the above game system.

FIG. 11 shows an example of the screen right before execution of the magic selection and use routine 900. Here, the player character 950 and enemy character 960 are displayed. An MP gauge 990 showing the current value of the magic point MP is also displayed. FIG. 12 shows an example of the screen right after the icon group display step 901 is first executed. The plurality of already acquired icons in the initial group of icons are displayed at the bottom right of the screen as the group of icons 980 for selection of magic. In the present example, it is assumed that all of the five icons belonging to the initial group of icons are displayed. At this time, the cursor 982 is positioned over the initial icon 981 of the group of displayed icons 980. That icon is displayed highlighted for example. It is also possible to display the icon at which the cursor 982 is positioned enlarged.

After the icon group display step 901 is executed, the effect range display step 902 for previewing the range of effect of magic corresponding to the icon at which the cursor 982 is positioned is immediately executed. Here, previewing a range of effect of magic corresponding to an icon on a screen means displaying the range of effect on the screen without regard as to whether that magic is to be used. The effect range display step 902 may also be called a preview step. In the current case, the icon at which the cursor 982 is positioned is magic positioned at the top of the attack type group of magic. According to FIG. 5, the effect area data of the magic shows the area of effect is the gun type. Therefore, an area of effect affected by the magic in the virtual space in which the player character is present is determined in accordance with the effect area data on the screen. As shown in FIG. 12, a tubular skeletal graphic 972 showing the area of effect is displayed at the position of that area of effect as a graphic in the virtual space. Further, the name of magic 986 "ENERGY SHOT" is displayed below the group of icons 980. The MP gauge 990 showing the value of the magic points MP of the player character is updated to show the current value and the value remaining after selecting the magic.

In this way, in the first embodiment of the present invention, the range of effect of magic is displayed on the screen as a graphic in the virtual space in which the player character is present in the state where the player character 950 and enemy character 960 are displayed and before the use of the magic. The radii Rg1, Rg2 of the cross-sections of the two sides of the tube and the length Hg of the tube are designated by the effect area data of the magic. The graphics showing the areas of effect displayed for various types of areas of effect and their display positions in the virtual space are as already explained in relation to FIG. 6. In the case of a tubular skeletal graphic, the center line of the tube starts from the reference point determined for the player character, for example, a point at the substantial center of the face. The position of the tubular skeletal graphic in the virtual space is determined based on the position of the player character so as to be parallel with the horizontal plane of the virtual space in which the player character is positioned and extends in a direction away from the player character. The player can determine the type of the range of effect of the magic by this skeletal graphic before use of the magic, so the display of the range of effect is beneficial for deciding whether to use the magic.

When the player desires to check the range of effect of other magic of the same attack type without instructing use of the magic, he/she depresses the right key in the group of directional keys 31. When this operation is detected (steps 903 and 904), the cursor 982 is moved over the adjoining right icon (step 905) and that adjoining icon is selected. Next, the effect range display step 902 is immediately executed for that adjoining icon, and a graphic showing the area of effect of the magic corresponding to that adjoining icon is newly displayed on the screen in place of the already (i.e., previously) displayed effect area graphic. Next, if the player repeatedly operates the same right key, graphics showing the area of effect of magic corresponding to the other icons in the group of icons 980 are successively displayed on the screen. Note that when the player operates the left key in the group of directional keys 31, a similar operation is executed for the adjoining left icon (steps 903, 904, 905, and 902).

Figure 13:
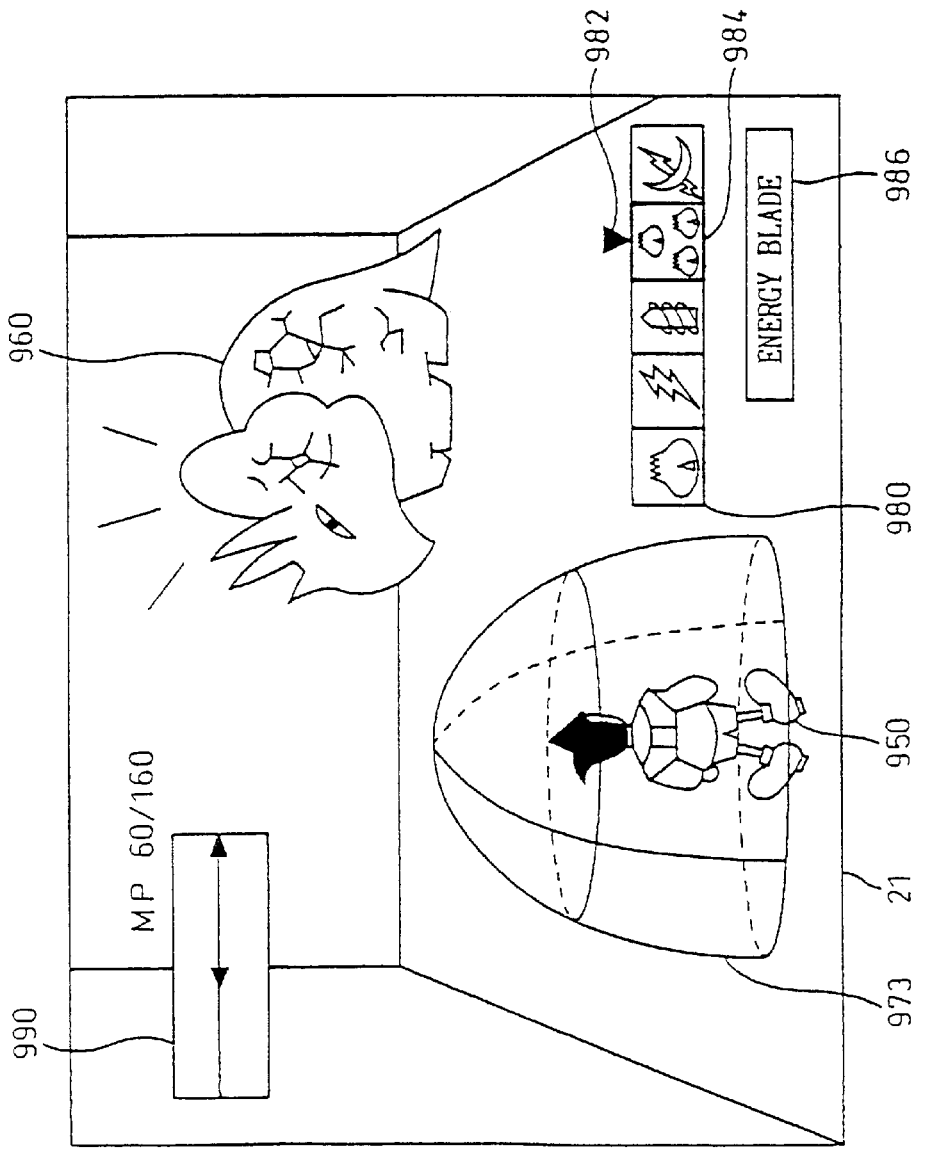
FIG. 13 is a schematic view of an example of a screen displaying a group of icons for magic selection and an area of effect of other magic displayed when executing the magic selection routine according to the invention in the above game system.

In this way, a cylindrical type area of effect, gun type area of effect, and dome type area of effect are displayed for the second to fourth magics in the attack type group of magic. FIG. 13 shows an example of a screen displaying the graphic 973 showing a dome type area of effect for the fourth magic. The name of the fourth magic 986, "ENERGY BLADE" is also displayed. This graphic is displayed when the cursor 982 is moved over the fourth icon 984 of the group of icons 980. Note that for the fifth magic of the attack type group of magic, as the graphic showing the effect range, the screen area other than the player character is displayed in green. For recovery type or strengthening type magic, the power of the magic reaches the player character itself, so that for the graphic showing the range of effect of the magic, the player character itself is displayed in green.

Figure 14:
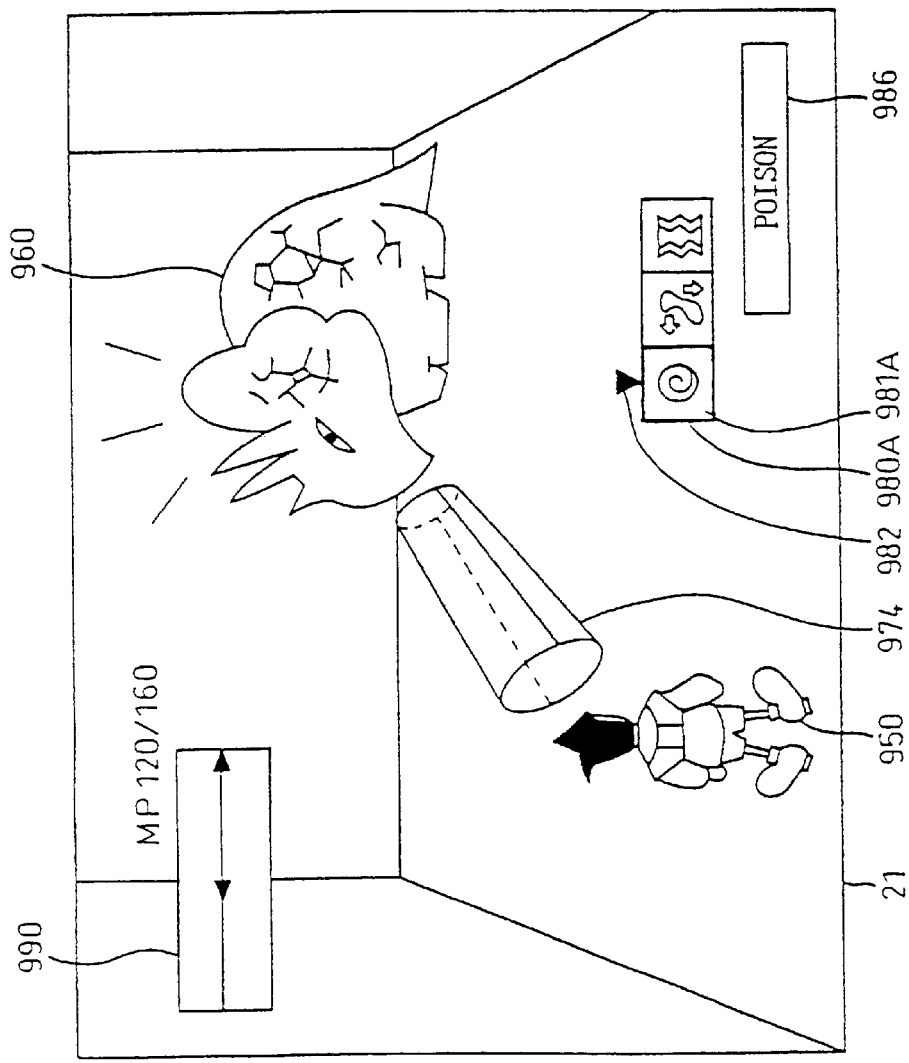
FIG. 14 is a schematic view of an example of a screen displaying another group of icons and an area of effect of other magic displayed when executing the magic selection routine according to the invention in the above game system.

When the player desires to check the range of effect of magic of another attribute without instructing use of the magic of the attack type, he/she depresses the down key in the group of directional keys 31. When this operation is detected (steps 903 and 906), the next group of icons is selected (step 907), the icon group display step 901 for the group of icons is executed, and the plurality of icons acquired by the player character are displayed on the screen in this group of icons. In the current case, three icons are displayed from the five icons corresponding to the magic of the reinforcement type. FIG. 14 shows an example of the screen when such a group of icons 980A is displayed. In the current case, the cursor 982 is positioned over the initial icon 981A. The area of effect of the magic corresponding to the icon 981A is a gun type as will be understood from FIG. 6. The name of the magic 986 "POISON" is also displayed. Therefore, a cylindrical skeletal graphic 974 is displayed on the screen. In the same way as previously, the player can display on the screen the area of effect of magic corresponding to an icon in the group of icons by operating the right key or left key. When the player desires to display the one previous group of icons, by operating the up key in the group of directional keys 31, the previous group of icons is displayed (steps 906, 907).

The above effect area display is repeated until the player inputs an instruction to use the magic. When the player determines the magic to be used by this repeated operation, the player moves the cursor 982 over the icon corresponding to the magic and in that state depresses a specific key instructing use of the magic, for example, the second function button 35. If the instruction for use of magic is detected (step 903), the processing for selection of magic used for a fight is ended and the execution of the magic is shifted to. That is, the magic corresponding to the icon at which the cursor 982 is positioned at that time is used (step 908). The state of use of the magic is displayed on the screen 21. The magic selection and use routine 900 ends in this way.

As explained above, in the first embodiment of the present invention, a so-called preview function of the range of effect of magic is provided which displays on the screen the range of effect of magic before use of that magic is instructed and thereby enables the player to check the range of effect of various types of magic before selecting the magic to be used by the player character. The player can have the range of effect of various types of magic displayed on the screen, so that he/she can determine the differences in the various types of magic and can easily select the desired magic. Further, since the range of effect is displayed by a graphic, the player can easily learn about the differences in the range of effect of various types of magic. In particular, by displaying a graphic showing the area in a virtual space in which the player character is present as a range of effect and as a graphic in that virtual space as it is, like the first embodiment of the present invention, the player can learn about the range of effect in more detail. In particular, when an attack type or an other type of magic is displayed, it becomes possible to judge the effectiveness of the magic with respect to an enemy character, that is, whether the enemy character is in the area of effect. Due to this, magic certain to have an effect on an enemy character can be selected. Further, it is possible to reduce the cases of a player uselessly selecting magic not effective against an enemy character.

Second Embodiment

Next, a second embodiment of the present invention will be explained. In the second embodiment, the mode of display of the icons for the magic and the method of selection of the magic used differ from those of the first embodiment. That is, in the first embodiment, a group of icons was displayed on the screen and the cursor moved in response to operational input of the player so as to select magic. In the second embodiment, on the other hand, all of the icons are displayed on the screen arranged in a ring. Further, the magic is selected by making the icon of the magic to Ae used move to a predetermined position in response to an operational input of the player.

Note that the configuration of the game system for realizing the second embodiment is similar to the configuration shown in FIG. 1 and FIG. 2. Further, in the second embodiment, the data stored in the RAM at the time of execution of the game program and the structure of that data are similar to those shown in FIG. 4, FIG. 5, FIG. 6, FIG. 7, and FIG. 8. In the following explanation, the processing routine of the second embodiment will be explained with reference to the configuration of the game system of FIG. 1 and FIG. 2 and the data shown in FIG. 4, FIG. 5, FIG. 6, FIG. 7, and FIG. 8.

Figure 15:
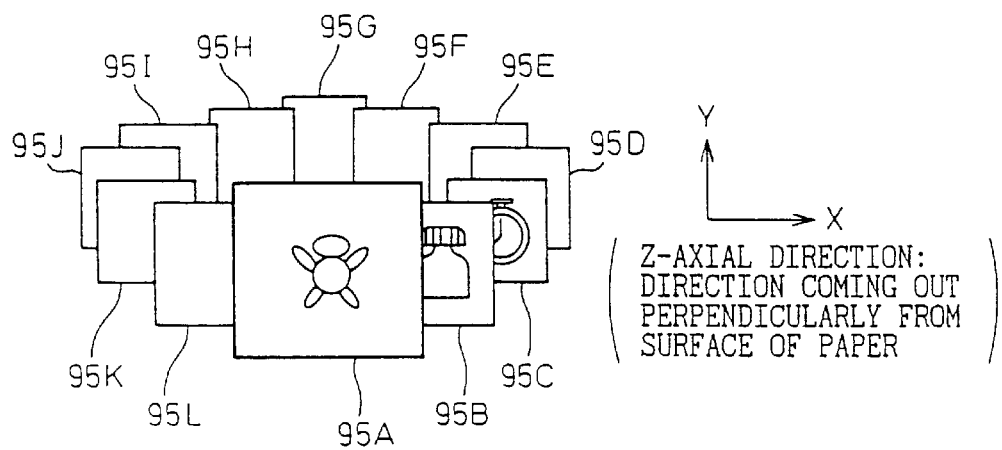
FIG. 15 is a schematic view of examples of a plurality of icons arranged on a ring shaped path.

FIG. 15 shows an example of the display of the icons in the second embodiment. In FIG. 15, a plurality of icons are arranged in a virtual three-dimensional space. The virtual three-dimensional space is expressed by X-Y-Z three-dimensional coordinate axes. In FIG. 15, the right direction is the positive direction of the X-axis, the upper direction is the positive direction of the Y-axis, and the direction from the paper toward the view is the positive direction of the Z-axis. The depth of the icon in the virtual three-dimensional space is defined by the Z-axis of the position where the icon is arranged. The larger the Z-value of the position at which the icon is arranged, the more toward the front of the screen display the icon is.

In the example shown in FIG. 15, the ring shaped path (not shown) is defined to be parallel to the X-Z plane. A plurality of icons 95A, 95B, 95C, 95D, 95E, 95F, 95G, 95H, 95I, 95J, 95K, and 95L are arranged along this ring shaped path. Pictures, graphics, etc. showing the type of the magic associated with each icon are drawn for the icons 95A, 95B, 95C, 95D, 95E, 95F, 95G, 95H, 95I, 95J, 95K, and 95L.

The icons 95A, 95B, 95C, 95D, 95E, 95F, 95G, 95H, 95I, 95J, 95K, and 95L can be made to move along the ring shaped path. For example, when the right key of the group of directional keys 31 (shown in FIG. 1) is depressed, the icons move along the ring shaped path in the counter clockwise direction when viewing the ring shaped path from above from the positive direction of the Y-axis toward the negative direction. Conversely, when the left key of the group of directional keys 31 (shown in FIG. 1) is depressed, the icons move along the ring shaped path in the clockwise direction when viewing the ring shaped path from above from the positive direction of the Y-axis toward the negative direction.

By movement of the icons along the ring shaped path, the frontmost displayed icon is changed. For example, when the right key of the group of directional keys is depressed in the state shown in FIG. 15, the icon 95L moves to the right front. As a result, the icon 95L is displayed frontmost. Further, when the left key of the group of directional keys is depressed in the state shown in FIG. 15, the icon 95B moves to the left front. As a result, the icon 95B is displayed frontmost in the Z-direction.

In this way, it is possible to make the icons rotate in response to operational input by the player. By rotation of the icon, the frontmost icon is changed. Further, the range of effect of magic corresponding to the icon arranged frontmost is displayed on the screen. Further, when an operational input instructing use of magic is detected, the magic corresponding to the icon arranged frontmost in the Z-axis direction is used.

Note that the icons 95A, 95B, 95C, 95D, 95E, 95F, 95G, 95H, 95I, 95J, 95K, and 95L displayed on the screen are displayed larger the more to the front in the Z-axis direction an icon is positioned. Further, when a plurality of icons overlap, the frontmost icon of the overlapping portion is displayed. Further, it is also possible to highlight the frontmost icon. For example, in the example of FIG. 15, the size of the frontmost icon 95A in the Z-axis direction is displayed enlarged.

Next, an explanation will be made of the processing in the second embodiment.

The overall flow of processing of the game program for realizing the second embodiment is similar to the flow of processing shown in FIG. 3. That is, the game program for realizing the second embodiment includes the initialization routine 400 and main routine 500. The main routine 500 includes a plurality of fight routines 700. When the game ends in the middle of a fight routine or when the player instructs suspension of the game at the time of the end of any of the fight routines 700 or when all processing of the main routine finishes being executed, the main routine 500 ends.

Further, the flow of processing of the fight routine in the second embodiment is the same as the flow of processing shown in FIG. 9. That is, in each fight routine 700, it is repeatedly checked if an enemy character has entered the fight range seen from the player character (step 701). When an enemy character has entered the fight range, preparations for the fight are made (step 702). When a predetermined time then elapses without an operational input of the player (NO in step 703), the attack on the enemy character is executed (step 705). If there is operational input by the player (YES in step 703), the type of input is judged (step 704) and the weapon attack step 800 or magic selection and use routine 900 is executed according to that type.

In the enemy character attack processing (step 705), the enemy character is made to execute a predetermined action for attacking the player character. The above processing is repeated until it is judged that the fight has ended (step 706). When the fight ends with a win (YES in step 707), the current experience value EXP_NOW of the player character is increased by a predetermined value (step 708) and the fight routine 700 ends. If the fight ends in a loss (NO in step 707), the game over processing 709 is executed, the fight routine 700 ends, and the main routine 500 ends.

When it is judged at step 704 that the player has depressed a predetermined button for attack by a weapon, for example, the weapon attack step 800 is executed (step 800). On the other hand, when it is judged at step 704 that the player has depressed a predetermined button for selection of magic, the magic selection and use routine 900 is executed.

Next, the magic selection and use routine in the second embodiment will be explained. In the magic selection and use routine in the second embodiment, the icons corresponding to the plurality of magic are arranged in a ring and displayed on the screen as options for selection of magic. Due to this, the operation of the player for selection of magic is assisted.

Figure 16:
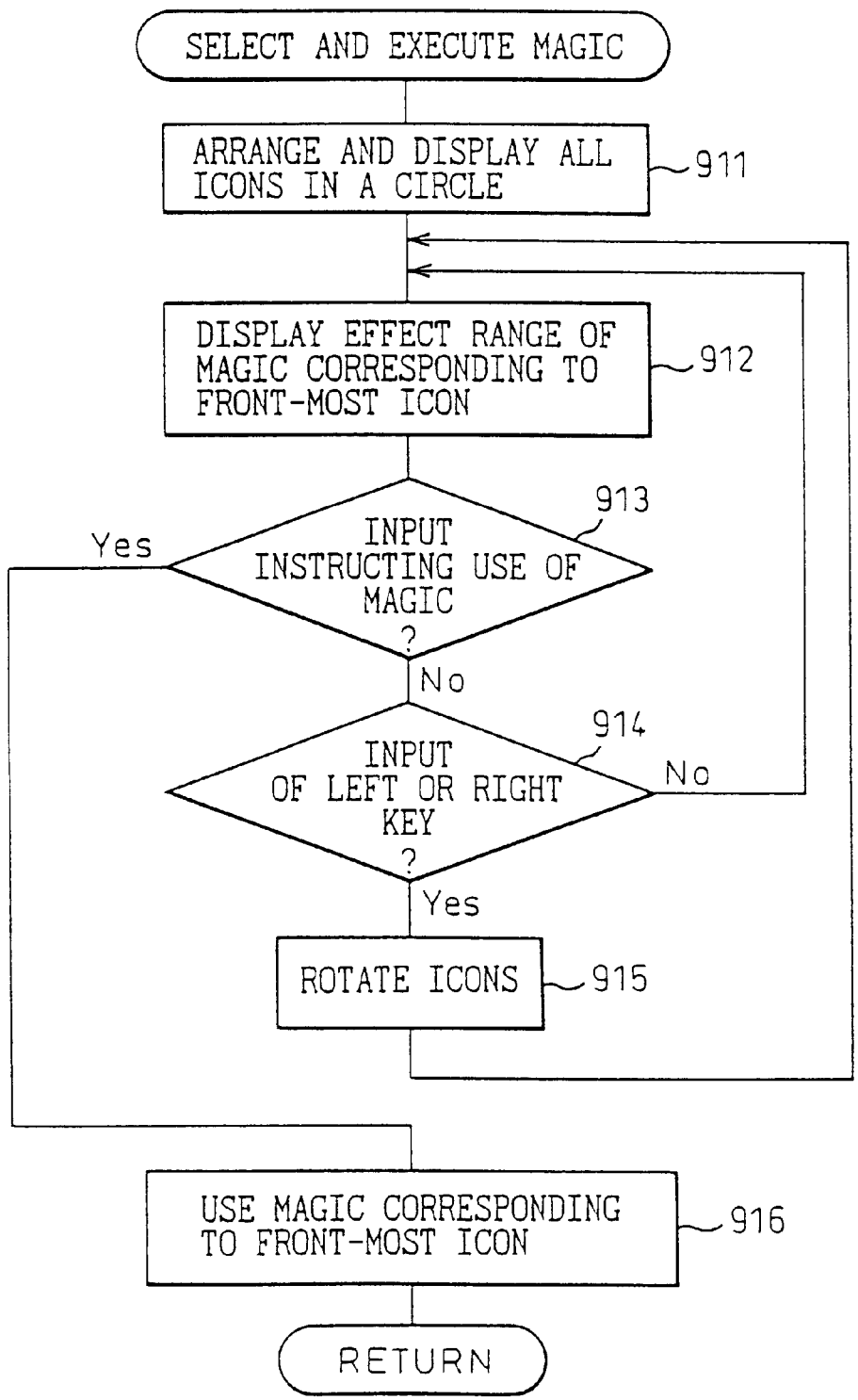
FIG. 16 is a view of the general flow of a magic selection routine in the second embodiment.

FIG. 16 is a view of the magic selection and use routine in the second embodiment. This processing routine is executed when an operational input for selection of magic is detected at step 704 in FIG. 9.

When the processing for the magic selection and use routine is started, the icons corresponding to the plurality of magic are arranged on a ring shaped path (step 911). That is, the path of movement of the icons is defined by a ring shaped path in the virtual three-dimensional space of the game. Further, the icons are arranged on the ring shaped path. Note that the data of the icon images displayed is acquired from the related data area 103d of the RAM 103.

After the execution of icon display, the range of effect of magic corresponding to the icon displayed frontmost in the plurality of icons arranged on the ring shaped path is previewed on the screen (step 912). Here, previewing the range of effect of magic corresponding to an icon on the screen means displaying the range of effect on the screen without regard to whether the magic is used. The preview enables the range of effect of magic to be displayed by a skeletal graphic. The data of the skeletal graphic is acquired from the related data area 103d of the RAM 103.

After the preview, it is judged if there has been any input instructing use of the magic from the player. If there has been input instructing use of magic, the routine proceeds to the processing of step 916. If there is no input instructing use of magic, it is judged if there has been any depression of the right key or left key in the group of directional keys 31. If depression of the right key or left key has been detected, the icons displayed are rotated (step 915). If the right key is depressed, the icons rotate counter clockwise along the ring shaped path (when viewing ring shaped path from the positive direction of Y-axis towards the negative direction). Further, if the left key is depressed, the icons rotate clockwise along the ring shaped path (when viewing ring shaped path from the positive direction of Y-axis towards the negative direction).

Due to this rotational movement, the frontmost icon displayed is changed. After the rotation of the icons, the routine proceeds to the processing of step 912 and the magic corresponding to the icon displayed frontmost is previewed.

On the other hand, if no depression of the right key or left key of the group of directional keys 31 is detected in the judgement of step 914 (NO in step 914), the icons are not rotated and the routine proceeds to the processing of step 912.

Further, when input instructing use of magic is detected at step 913 (YES in step 914), the magic corresponding to the icon displayed frontmost is used. After use of the magic, the magic selection and use routine ends and the processing proceeds to step 705 of FIG. 9.

In the above way, it is possible to select any icon from among the plurality of icons arranged in a ring. It is possible to preview the range of effect of magic linked with the selected icon.

Figure 17:
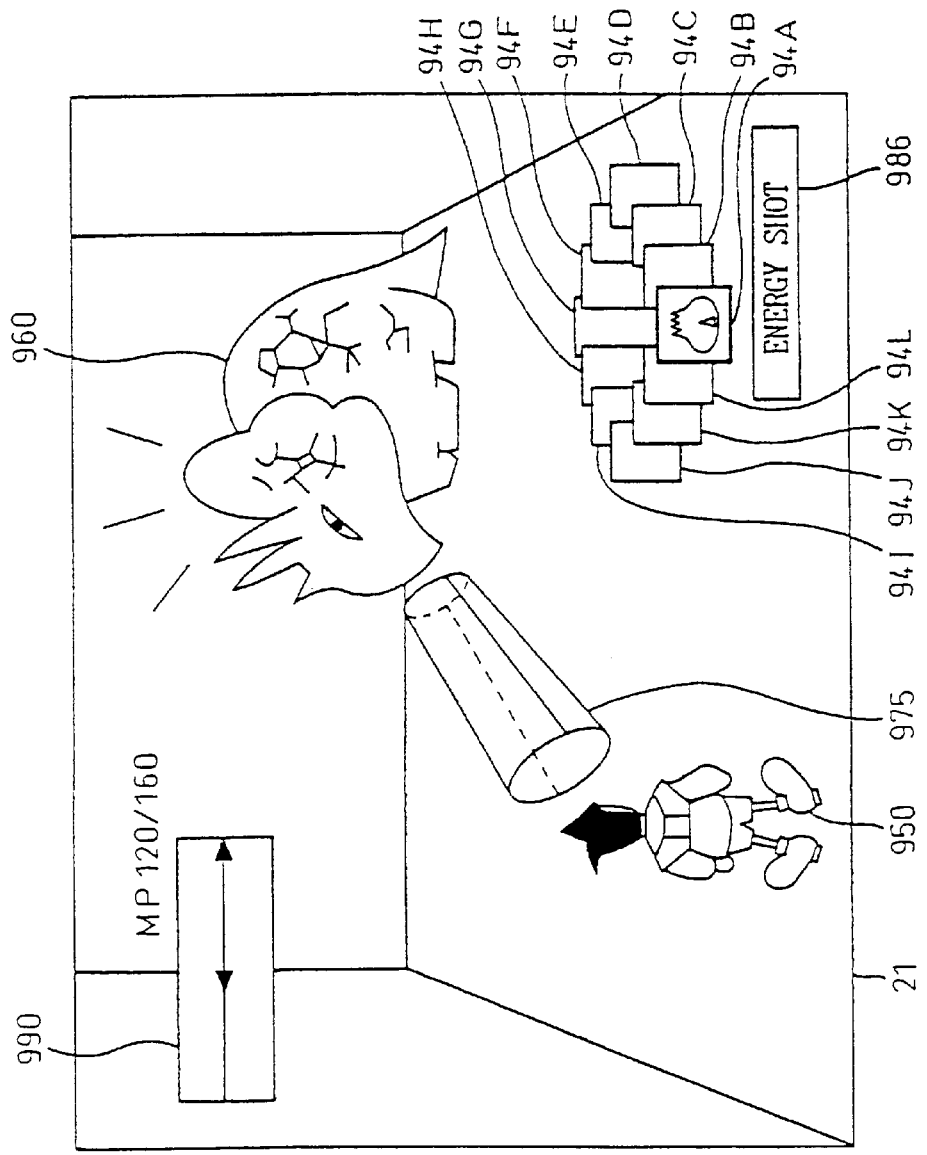
FIG. 17 is a first view of an example of a display screen in the second embodiment.

Next, the changes in the display screen in the second embodiment will be explained. FIG. 17 shows an example of the display screen 21 displayed when a predetermined button for selection of magic is depressed at step 704 of FIG. 9. In the example of FIG. 17, the player character 950 and enemy character 960 are displayed.

At the bottom right in the display screen 21, a plurality of icons 94A, 94B, 94C, 94D, 94E, 94F, 94G, 94H, 94I, 94J, 94K, and 94L are displayed along the ring shaped path. The icon 94A displayed frontmost is displayed highlighted.

A tubular skeletal graphic 975 showing the area of effect of the magic linked with the icon 94A displayed frontmost is displayed at the position of the area of effect. At the top left of the display screen 21 the MP gauge 990 is displayed. The MP gauge 990 shows the current value of the magic points MP of the player character 950 and the remaining value after selection of magic by the arrows. Above the MP gauge 990 are shown the current value of the magic points MP (in the example of FIG. 17, "160") and the value remaining after selection of the magic (in the example of FIG. 17, "120") by numerals.

Further, below the plurality of icons 94A, 94B, 94C, 94D, 94E, 94F, 94G, 94H, 94I, 94J, 94K, and 94L arranged in the ring is displayed the name of magic 986 "ENERGY SHOT" linked with the icon 94A displayed frontmost.

If the player depresses the left key or right key in the group of directional keys 31 in the state shown in FIG. 17, the plurality of icons 94A, 94B, 94C, 94D, 94E, 94F, 94G, 94H, 94I, 94J, 94K, and 94L rotate along the ring shaped path. For example, when the left key of the group of directional keys 31 is depressed, the icons 94A, 94B, 94C, 94D, 94E, 94F, 94G, 94H 94I, 94J, 94K, and 94L rotate clockwise along the ring shaped path. Note that the direction of rotation spoken of here is the direction of rotation when viewing the virtual three-dimensional space in which the player character 950 is arranged from the top to bottom.

FIG. 18 is a view of an example of the display screen 21 when the left key of the group of directional keys 31 is depressed. As shown in FIG. 18, due to rotation of the icons 94A, 94B, 94C, 94D, 94E, 94F, 94G, 94H, 94I, 94J, 94K, and 94L, the icon 94B is arranged frontmost. The icon 94A displayed frontmost in the display screen of FIG. 17 is displayed to the left rear of the icon 94B. The icon displayed frontmost is changed to the icon 94B, whereby the skeletal graphic 976 showing the area of effect of the magic linked with the icon 94B is displayed. The skeletal graphic forms a dome shape and is displayed at a position covering the player character 950.

The MP gauge 990 is changed in accordance with the value of the magic points MP remaining after selection of the magic linked with the icon 94B. In the example of FIG. 18, the remaining value after selection of magic is changed to "60". Further, below the plurality of icons 94A, 94B, 94C, 94D, 94E, 94F, 94G, 94H, 94I, 94J, 94K, and 94L displayed in the ring is displayed the name of magic 986 "ENERGY BLADE" linked with the icon 94B displayed frontmost.

In this way, in the second embodiment, the range of effect of magic linked with the icon displayed frontmost on the ring shaped path is displayed on the screen as a skeletal graphic in the virtual space in which the player character is present. The player can therefore determine the range of effect of the magic by the skeletal graphic before use of magic. Accordingly, he/she can swiftly render a judgement on whether to use the magic.

Further, in the second embodiment, since all of the icons are simultaneously displayed on the ring shaped path, it is easy to discern the options other than the option selected (icon displayed frontmost). Further, the player can easily judge in which direction to move the icons along the ring shaped path in order to select the desired icon. As a result, the time required for the operation for selecting the icon linked with the desired magic becomes shorter.

Note that the present invention is not limited to the above embodiments and can be suitably modified or changed within the scope of the gist of the invention.

For example, as the method of display of the range of effect of magic, it is also possible to adopt the method of displaying a simplified image simply showing the type of the range of effect of magic, instead of the graphic showing the area of effect in the virtual space, without regard as to the virtual space in which the player character is present. For example, it is possible to show one of the gun type, cylinder type, dome type, the entire screen, or the player character itself, store in advance in the RAM 103 a plurality of range display images including graphics not related with the virtual space in which the player character is present, and display the range display image prepared for magic corresponding to the selected icon as a range of effect below or above the selected icon. For example, it is also possible to use the image showing the display graphic shown in FIG. 6 minus the text portion. Simplified effect range display images corresponding to the case where the range of effect is the entire screen and the player character itself are separately prepared. In the above embodiment, since the area of effect in the displayed virtual space is displayed on the screen by a graphic in the virtual space, it is possible to judge the effectiveness of magic—relating to whether the enemy character is present in the area of effect. In the case of the range display image used in the modification discussed here, however, it is possible to judge the effectiveness in this way. Since it is possible to identify the type of the range of effect of the magic, however, the modification is effective for the selection of magic at least in this respect.

Note that when obtaining magic in the setting change routine 600, it is also possible to display a graphic showing such a simplified range of effect and assist the acquisition of magic by the player.

In the above embodiments of the present invention, the effect range display step 902 displaying on the screen the range of effect of magic corresponding to the cursor position was executed each time the icon group display step 901 was executed. Sometimes the player is well aware of the range of effect of each magic. At this time, display of the range of effect on the screen could be considered troublesome. For such a player, the effect range display step 902 may be performed only upon the request of the player. Further, such a player request may be made to be received during the setting change routine 600. As the method for this, so long as this set request is not subsequently changed, the request is effective for the plurality of fight routines in the main routine 500. This method has the advantage that, for a novice player, once the request is set, that request becomes effective for the plurality of fight routines even without subsequent setting. Further, for a player familiar with the magic, so long as he/she does not set the request, he/she can immediately select the magic without having to view the display of the range of effect in any fight routine. Further, it is also possible to accept such a request by a player each time the icon group display step 901 is executed. This method is effective for displaying the range of effect when for example a player familiar with the magic happens to forget the range of effect of some magic. Note that the above two methods of accepting requests may also be used together.

In the above icon group display step 901, only the obtained icons in the group of icons of the same attributes were displayed, but of course it is also possible to display all of the group of icons and mask non-selected icons to prevent selection.

The present invention is not limited to the specific type of action of "magic" and may also be applied to a plurality of other actions with different ranges of effect. For example, it is possible to also consider use of a weapon as an action. The range of effect of attack by the weapon becomes the range of effect here. The program can be changed to enable a player to select a desired weapon from among such weapons. That is, when a weapon having a special range of effect is included in the weapons which can be used in the game, a weapon selection and use routine for selecting a weapon for use during a fight is provided in the program in the same way as the magic selection and use routine. When this routine is called by the player, the ranges of effect of the weapons are previewed on the screen in the same way as the above embodiment. Due to this, when a player selects a weapon for use by the player character, he/she can obtain an intuitive grasp of the range of effect of the weapon, so can be assisted in selection of the action of use of a weapon.

In the above embodiments, an icon was displayed on the screen as the option for magic and other action which a character can execute. Thus, compared with displaying a list of options expressed by text, it is possible to minimize the area in the screen of the area displaying the list of options. Further, the player can easily select a desired option since he/she can deduce the content of the action visually by the icon image. The present invention, however, can also be applied to a program displaying options by text. In this case, each time the cursor is moved over the plurality of options displayed by the text, it is sufficient to display on the screen a graphic showing the range of effect of action corresponding to the new option at which the cursor is positioned.

In the above embodiments, the program and data for working the present invention were stored in a CD-ROM loadable in the computer of the game console and that CD-ROM used as a program product. The program and data used in the game console according to the present invention can also be provided by other methods. For example, the method may also be used by including a program using the method of assisting selection of action according to the present invention in a carrier wave used for communication and sending and receiving the carrier wave as a computer data signal for operation of the computer. For example, it is also possible to use the communication interface unit 109 shown in FIG. 2 to download and use a program from other not shown equipment on a network 110 connected via a communications line 111. It is also possible to store the above program and data in advance in a memory of other equipment on a network 110 connected via the communications line 111 and store and use the program and data successively in the RAM 103 through the communications line 111 in accordance with need. Alternatively, it is possible to construct the game console 10 to enable support of both such a mode of use and use of a CD-ROM.

The computer comprising part of the game system shown in the above embodiments of the present invention may be provided with a logic circuit for executing part of the functions of the program used there and may change the program so as to change the method of execution of functions of the program used there along with the same.

In the above embodiments of the present invention, the input device and output device were provided separate from the game system. One or both of the input device and output device, however, may be formed integral with the game system. Further, the program product used in the game system may be detachable from the game system or may be built into the game system.

The program product according to the present invention or the program product used in the game system according to the present invention is not limited to a CD-ROM and may be any other computer readable program product. For example, it may be a DVD, magnetic recording medium, semiconductor memory, or other optical recording medium.

In the above embodiments, a home game system was used as the platform, but the game system according to the present invention may also be realized by a personal computer or other general use computer or an arcade machine as a platform. Further, it may be realized using a cellular phone, a portable data terminal, a car navigation system, or other communications terminal as a platform.

Further, in the above embodiments, the example was shown of a controller of a game system as an input device, but it is also possible to use other input devices. For example, it is also possible to use a keyboard, mouse, or the like as an input device.

Summarizing the effect of the invention, since the ranges of effect of a plurality of actions which a character can execute are previewed on a screen, the player can obtain an intuitive grasp of the range of effect of each action and therefore can more easily select an action.

While the invention has been described by reference to specific embodiments chosen for purposes of illustration, it should be apparent that numerous modifications could be made thereto by those skilled in the art without departing from the basic concept and scope of the invention.

What is claimed is:

1. A method for assisting selection of action for a player selecting one of a plurality of actions which a character on a screen can execute, comprising:

displaying a plurality of options associated with said plurality of actions on the screen; and displaying a graphic, in virtual three dimensions, that visually depicts a preview on the screen of a range of effect of an action corresponding to an option selected by an operational input by the player from the plurality of displayed options.

2. The method of assisting selection of action as set forth in claim 1, further comprising shifting from previewing the range of effect of the action on the screen to executing the action corresponding to the selected option.

3. The method of assisting selection of action as set forth in claim 1, further comprising, in the previewing, switching the range of effect of the action previewed, each time switching of the option is selected by the operational input by the player.

4. The method of assisting selection of action as set forth in claim 1, wherein the plurality of options comprise a plurality of icons corresponding to the plurality of actions.

5. The method of assisting selection of action as set forth in claim 4, in which the plurality of icons are divided into at least two groups of icons; and displaying the plurality of options comprises displaying one group of icons of the at least two groups of icons on the screen and switching to displaying another group of icons in response to an operational input by the player.

6. The method of assisting selection of action as set forth in claim 1, further comprising:

determining the range of effect of action based on a position of the character.

7. A program product storing a program for a video game to be executed by a computer, said program causing said computer:

to display a plurality of options associated with a plurality of actions able to be executed by a character on a screen; and to display a three dimensional graphic, in virtual space, enabling a preview of a range of effect on the screen of an action corresponding to an option selected by an operational input by the player from the plurality of displayed options, the preview indicating at least a distance from the character on the screen.

8. The program product as set forth in claim 7, said program further causing said computer to shift from previewing the range of effect of the action on the screen to executing the action corresponding to the selected option.

9. The program product as set forth in claim 7, said program further causing said computer, in the previewing, to switch to displaying another three dimensional graphic, in the virtual space, enabling a preview of a range of effect of an action corresponding to another option selected by an operational input by the player.

10. The program product as set forth in claim 7, wherein the plurality of options comprise a plurality of icons corresponding to the plurality of actions.

11. The program product as set forth in claim 10, wherein:

the plurality of icons are divided into a plurality of groups of icons; and said program further causing said computer, in displaying the plurality of options to display one group of icons of the plurality of groups of icons on the screen and to switch to displaying another group of icons of the plurality of groups of icons in response to an operational input by the player.

12. The program product as set forth in claim 7, said program further causing said computer to determine the range of effect of the action based on a position of the character.

13. The program product as set forth in claim 12, said program further causing said computer to change, in the preview, the color of the character when said action has an effect on the character.

14. A game system for executing an action selected by a player among a plurality of actions which a character on a screen can execute, comprising:

a system that displays a plurality of options linked with said plurality of actions on the screen; and a system that graphically displays on the screen, in virtual three dimensions, a preview of a range of effect of an action corresponding to an option selected by an operational input by the player from the plurality of displayed options.

15. The game system as set forth in claim 14, further comprising a system that shifts from previewing the range of effect of the action on the screen by the preview system to executing the action corresponding to the selected option in response to an operational input by the player.

16. A game system, as set forth in claim 14, wherein said preview system switches the range of effect of action displayed by the preview system each time switching of the option is selected by the operational input of the player.

17. A game system used with a display device for displaying an image of a game and an input device for inputting an operation by a player, the game system comprising:

a computer programmed to display on the display device graphic information, depicted in three dimensions, showing a range of effect of an action designated by an operational input of the player from the input device, the action comprising one of plurality of actions able to be executed by a character on the display device.

18. The game system as set forth in claim 15, wherein said preview system switches the range of effect of action displayed by the preview system each time switching of the option is selected by the operational input of the player.

19. A method for previewing a plurality of actions which a character on a display screen of a video game can execute, the method comprising:

displaying on the display screen a plurality of options associated with the plurality of actions;

receiving an operational input from a player selecting one option of the plurality of options; and displaying a skeletal graphic on the display screen indicating a range of effect of the action associated with the selected option.

20. The method for previewing according to claim 19, further comprising:

switching from displaying the skeletal graphic on the display screen to displaying a second skeletal graphic corresponding to an operational input from the player selecting a second option of the plurality of options.

21. The method for previewing according to claim 19, in which the plurality of options comprises a plurality of icons divided into a plurality of icon groups;

the displaying the plurality of options comprising consecutively displaying the plurality of icon groups in response to consecutive operational inputs by the player.

22. A method for executing an action taken by a character in a video game, the method comprising:

receiving an operational input from a player to preview the action;

displaying a skeletal graphic on the display screen showing a range of effect of the action; and executing the action within the previewed range of effect.

23. The method for executing the action according to claim 22, in which the range of effect is displayed based on a position of the character.

* * * * *